(12) United States Patent
Frazzoli et al.

(10) Patent No.: US 11,460,842 B2
(45) Date of Patent: Oct. 4, 2022

(54) MIXED-MODE DRIVING OF A VEHICLE HAVING AUTONOMOUS DRIVING CAPABILITIES

(71) Applicant: Motional AD LLC, Boston, MA (US)

(72) Inventors: Emilio Frazzoli, Zurich (CH);
Harshavardhan Ravichandran, Singapore (SG); Eric Wolff, Cambridge, MA (US); Hsun-Hsien Chang, Brookline, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 15/688,540

(22) Filed: Aug. 28, 2017

(65) Prior Publication Data

US 2019/0064804 A1    Feb. 28, 2019

(51) Int. Cl.
| | |
|---|---|
| *B60R 25/00* | (2013.01) |
| *B60R 25/31* | (2013.01) |
| *G05D 1/02* | (2020.01) |
| *G01N 35/00* | (2006.01) |
| *G05D 1/00* | (2006.01) |
| *B60W 50/08* | (2020.01) |

(52) U.S. Cl.
CPC ......... *G05D 1/0061* (2013.01); *B60W 50/082* (2013.01); *G05D 1/0088* (2013.01); *B60T 2220/02* (2013.01); *B60W 2540/22* (2013.01); *G05D 2201/0213* (2013.01)

(58) Field of Classification Search
None
See application file for complete search history.

(56) References Cited

U.S. PATENT DOCUMENTS

| | | |
|---|---|---|
| 7,894,951 B2 | 2/2011 | Norris |
| 8,078,349 B1 | 12/2011 | Prada Gomez et al. |
| 8,618,922 B2 | 12/2013 | Debouck et al. |
| 8,731,137 B2 | 5/2014 | Arroyo et al. |
| 8,788,113 B2 | 7/2014 | Filev et al. |
| 8,874,301 B1 | 10/2014 | Roa et al. |
| 9,188,985 B1 | 11/2015 | Hobbs et al. |
| 9,201,421 B1 | 12/2015 | Fairfield et al. |
| 9,365,213 B2 | 6/2016 | Stenneth et al. |
| 9,399,472 B2 | 7/2016 | Minoiu-Enache |
| 9,523,984 B1 | 12/2016 | Herbach |
| 9,566,986 B1 | 2/2017 | Gordon et al. |
| 9,616,896 B1 | 4/2017 | Letwin et al. |
| 9,707,966 B2 | 7/2017 | Herbach et al. |
| 2005/0046584 A1 | 3/2005 | Breed |
| 2006/0089763 A1 | 4/2006 | Barrett et al. |
| 2007/0241881 A1 | 10/2007 | Golden |
| 2013/0054281 A1 | 2/2013 | Thakkar et al. |

(Continued)

FOREIGN PATENT DOCUMENTS

| | | |
|---|---|---|
| WO | WO2005073037 | 8/2005 |
| WO | WO2017021602 | 2/2017 |

OTHER PUBLICATIONS

U.S. Appl. No. 15/688,345, filed Aug. 28, 2017, Frazzoli et al.
(Continued)

*Primary Examiner* — Adam D Tissot
(74) *Attorney, Agent, or Firm* — Fish & Richardson P.C.

(57) ABSTRACT

Among other things, a vehicle having autonomous driving capabilities is operated in a mixed driving mode.

15 Claims, 9 Drawing Sheets

(56) References Cited

U.S. PATENT DOCUMENTS

| | | | |
|---|---|---|---|
| 2014/0244096 A1* | 8/2014 | An | B60W 50/08 701/25 |
| 2014/0303827 A1 | 10/2014 | Dolgov et al. | |
| 2015/0166009 A1 | 6/2015 | Outwater et al. | |
| 2015/0185732 A1 | 7/2015 | Debouk et al. | |
| 2016/0116913 A1* | 4/2016 | Niles | G01N 35/00 701/23 |
| 2016/0155083 A1 | 6/2016 | Takei et al. | |
| 2016/0207536 A1 | 7/2016 | Yamaoka | |
| 2016/0355192 A1 | 12/2016 | James et al. | |
| 2016/0358475 A1 | 12/2016 | Prokhorov | |
| 2016/0365162 A1 | 12/2016 | Johnson et al. | |
| 2017/0028987 A1 | 2/2017 | Yamada et al. | |
| 2017/0057510 A1 | 3/2017 | Herbach et al. | |
| 2017/0080900 A1* | 3/2017 | Huennekens | G08B 21/00 |
| 2017/0088143 A1 | 3/2017 | Goldman | |
| 2017/0110022 A1 | 4/2017 | Gulash | |
| 2017/0124781 A1 | 5/2017 | Douillard et al. | |
| 2018/0010915 A1 | 1/2018 | Wilhelm | |
| 2018/0039917 A1 | 2/2018 | Buttolo et al. | |
| 2018/0086344 A1 | 3/2018 | Zhu et al. | |
| 2018/0194356 A1 | 7/2018 | Richards et al. | |
| 2018/0203455 A1 | 7/2018 | Cronin | |
| 2018/0204399 A1 | 7/2018 | Newman | |
| 2018/0251135 A1 | 9/2018 | Luo et al. | |
| 2018/0339712 A1 | 11/2018 | Kislovskiy et al. | |
| 2018/0356817 A1 | 12/2018 | Poeppel | |
| 2019/0031202 A1 | 1/2019 | Takeda | |
| 2019/0064800 A1 | 2/2019 | Frazzoli et al. | |
| 2019/0064801 A1 | 2/2019 | Frazzoli et al. | |
| 2019/0064802 A1 | 2/2019 | Frazzoli et al. | |
| 2019/0064803 A1 | 2/2019 | Frazzoli et al. | |
| 2019/0064805 A1 | 2/2019 | Frazzoli et al. | |
| 2019/0243002 A1 | 8/2019 | Song | |
| 2020/0051194 A1 | 2/2020 | Park et al. | |
| 2020/0074396 A1 | 3/2020 | Boccuccia et al. | |
| 2020/0193368 A1 | 6/2020 | Bhatia et al. | |
| 2020/0394746 A1 | 12/2020 | Krishnamurthy et al. | |
| 2021/0012125 A1* | 1/2021 | Schmidt | H04W 4/40 |
| 2021/0295256 A1 | 9/2021 | Sajnovic | |

OTHER PUBLICATIONS

U.S. Appl. No. 15/688,470, filed Aug. 28, 2017, Frazzoli et al.
U.S. Appl. No. 15/688,500, filed Aug. 28, 2017, Frazzoli et al.
U.S. Appl. No. 15/688,530, filed Aug. 28, 2017, Frazzoli et al.
U.S. Appl. No. 15/688,548, filed Aug. 28, 2017, Frazzoli et al.
Florentine et al., "Pedestrian notification methods in autonomous vehicles for multi-class mobility-on-demand service." Proceedings of the Fourth International Conference on Human Agent Interaction, Oct. 4, 2016, pp. 387-392.
Pendleton et al., "Autonomous golf cars for public trial of mobility-on-demand service." Intelligent Robots and Systems (IROS), 2015 IEEE/RSJ International Conference on Sep. 28, 2018, pp. 1164-1171.
U.S. Appl. No. 16/712,918, filed Dec. 12, 2019, Bhatia.

* cited by examiner

MIXED-MODE DRIVING OF A VEHICLE HAVING AUTONOMOUS DRIVING CAPABILITIES

BACKGROUND

This description relates to mixed-mode driving of a vehicle having autonomous driving capabilities.

SUMMARY

In at least some examples, the technologies described in this document include a mixed-driving system that utilizes a mixture of autonomous driving capabilities and manual driving capabilities of vehicles to provide efficient uses of the vehicles.

In general, in one aspect, a method comprises: (1) automatically requiring a current driving mode of a vehicle to be one of (a) an autonomous driving mode, (b) a manual driving mode, or (c) another predefined driving mode; and (2) in response to updated information associated with the vehicle, the environment, or one or more occupants or parcels of the vehicle, automatically causing a transition from the current driving mode of the vehicle to a next driving mode that comprises one of the modes (a), (b), or (c).

In some implementations, the updated information may comprise indicative of a condition of the vehicle or of one or more of the occupants or parcels on board the vehicle. The updated information may comprise a preference of one or more of the occupants for operation of the vehicle in one of the modes (a), (b), or (c). The preference may comprise a preference for mode (b). The updated information may comprise a physical condition of one or more of the occupants. The physical condition may comprise a condition requiring emergency medical care.

In some implementations, the updated information may be associated with an identity of one or more of the occupants, with a license to manually drive the vehicle, with an impaired ability to manually drive, with a degree of danger associated with one or more parcels on board the vehicle, with a degree of danger associated with a driving environment of the vehicle, with the presence on board the vehicle of an occupant who has a preference for one of the driving modes, with a presence of an occupant in a driver's seat of the vehicle, or with combinations of them.

In some implementations, the updated information may be received from sensors configured to sense a condition on board the vehicle, or from a data source not on board the vehicle, or both. The updated information may comprise a booking by an occupant for the vehicle, or profile information for an occupant for the vehicle, or a command from a remote operator, or combinations of them.

In some implementations, the updated information may comprise a driving environment of the vehicle. In some implementations, the updated information may comprise one or more autonomous driving capabilities being disabled or enabled.

In some implementations, the current driving mode comprises a manual driving mode and the next driving mode comprises an autonomous driving mode; or, the current driving mode comprises an autonomous driving mode and the next driving mode comprises a manual driving mode; or, the current driving mode comprises a manual driving mode and the next driving mode comprises a paused driving mode; or, the current driving mode comprises an autonomous driving mode and the next driving mode comprises a paused driving mode; or, the current driving mode comprises an autonomous driving mode and the next driving mode comprises a disabled driving mode.

In some implementations, causing the transition may comprise smoothing a speed of the vehicle across the current driving mode and the next driving mode, evaluating a trajectory towards a goal position under the next driving mode, evaluating authentication of the one or more occupants under the next driving mode, recommending the next driving mode, inferring one or more intermediate driving modes between the current driving mode and the next driving mode, using a probabilistic model to optimally determine the next driving mode, or combinations of them.

In some implementations, causing the transition may be rejected when the next driving mode is infeasible or unsafe.

In general, in one aspect, a method comprises: (1) at a central server determining a next driving mode from a current driving mode for each vehicle in a fleet of vehicles, at least one vehicle in the fleet having both autonomous driving capabilities and manual driving capabilities, and the next driving mode comprising at least one of an autonomous driving mode, a manual driving mode, and a driving mode that uses a combination of autonomous driving capabilities and manual driving capabilities; and (2) sending signals wirelessly to each of the vehicles of the fleet identifying the next driving mode for that vehicle.

In some implementations, the method may comprise determining a sequence of the next driving modes for each of the vehicles and sending signals wirelessly to each of the vehicles identifying each of the next driving modes in the sequence of driving modes.

In some implementations, the next driving mode of each vehicle may be determined based on data representing one or a combination of two or more of the following factors: (a) a characteristic of one or more occupants for the vehicle, (b) a characteristic of one or more parcels on board the vehicle, (c) a condition of a driving environment of the vehicle, and (d) a condition of the vehicle.

In some implementations, the characteristic of one or more occupants of the vehicle may comprise at least one of: a preference of the occupant for a particular driving mode, a health-related condition of the occupant, or impairment of the occupant's ability to manually drive the vehicle.

In some implementations, the characteristic of one or more parcels on board the vehicle may comprise a destructive quality of the parcel.

In some implementations, the current driving mode comprises an autonomous driving mode and the next driving mode comprises a manual driving mode; the current driving mode comprises a manual driving mode and the next driving mode comprises an autonomous driving mode. In some implementations, at least one of the next driving modes comprises an emergency driving mode, a paused mode, or a disabled mode.

In some implementations, the method may comprise sending signals wirelessly to one or more of the vehicles of the fleet to require that the vehicles operate only according to the next driving mode.

In some implementations, determining the next driving mode may comprise validating a license to manually drive a vehicle of the fleet, evaluating a driving environment of a vehicle of the fleet, evaluating if one or more autonomous driving capabilities is disabled or enabled in a vehicle of the fleet, evaluating a trajectory towards a goal position under the next driving mode, evaluating authentication of the one or more occupants under the next driving mode, making a recommendation for the next driving mode, inferring one or more intermediate driving modes between the current driving mode and the next driving mode, or using a probabilistic model to optimally determine the next driving mode, or combinations of them.

In some implementations, the determined next driving mode may be rejected when the next driving mode is infeasible or unsafe.

In some implementations, the method may include receiving a booking from a user, receiving instructions of determining the next driving mode from a fleet operator, or both.

In general, in one aspect, a method comprises: (1) causing a vehicle that has both autonomous driving capabilities and manual driving capabilities to drive autonomously except while an identified occupant who prefers manual driving is in the vehicle, and (2) preventing the vehicle from driving autonomously and enabling the vehicle to be only in a manual driving mode while the identified occupant is in the vehicle.

In some implementations, the method may comprise identifying the occupant based on at least one of the following: stored profile information for the occupant, authentication of the occupant, or booking information.

In some implementations, the method may comprise causing the vehicle to switch to another driving mode if the occupant who is manually driving the vehicle is unable to manually drive the vehicle safely. The other driving mode may comprise at least one of an emergency driving mode, a disabled driving mode, or a paused driving mode.

In some implementations, the method may comprise causing the vehicle to switch to another driving mode comprises evaluating a physical condition of the identified occupant. Causing the vehicle to switch to another driving mode may comprise detecting a degraded driving performance of the identified occupant, evaluating a driving environment of the vehicle, evaluating if one or more autonomous driving capabilities is disabled or enabled, smoothing a speed of the vehicle switching to the other driving mode, evaluating a trajectory towards a goal position under the other driving mode, recommending the other driving mode, inferring one or more intermediate driving modes before reaching the other driving mode, or using a probabilistic model to optimally determine the other driving mode, or combinations of them.

In some implementations, causing the vehicle to switch to another driving mode is rejected when the other driving mode is infeasible or unsafe.

In general, in one aspect, a method comprises: (1) commanding a vehicle to drive autonomously to a location without any occupant in the vehicle; (2) after the vehicle has reached the location, authorizing an occupant to enter the vehicle, determining that the occupant has entered the vehicle and has begun to drive the vehicle; and (3) while the occupant is driving the vehicle, automatically preventing the vehicle from driving autonomously.

In some implementations, authorizing an occupant to enter the vehicle may comprise validating an identify of the occupant and a license of the occupant to manually operate the vehicle.

In some implementations, determining that the occupant has entered the vehicle may comprise detecting a presence of the occupant in a driver's seat of the vehicle.

In some implementations, the method may comprise disabling one or more autonomous driving capabilities while the occupant is driving the vehicle, maintaining one or more autonomous driving capabilities to be enabled while the occupant is driving the vehicle, or monitoring a condition of the vehicle or the occupant or a driving environment, or combinations of them.

In some implementations, the method may comprise switching the vehicle to an autonomous driving mode when the occupant requiring emergency medical care is detected, switching the vehicle to an autonomous driving mode when a degree of danger associated with a driving environment of the vehicle is detected, switching the vehicle to an autonomous driving mode when a request from the occupant is issued, switching the vehicle to an autonomous driving mode when the autonomous driving mode is algorithmically determined to be safer than the occupant manually driving the vehicle, commanding the vehicle in a disabled mode when the occupant reaches a goal position, or commanding the vehicle in a parked mode when the occupant reaches a goal position, or combinations of them.

In some implementations, the method may comprise the autonomous vehicle subsequently detecting that the vehicle is stopped and no occupant is present in the vehicle, and the autonomous vehicle driving autonomously to another location.

In some implementations, the method may comprise allowing the occupant to request another driving mode. Requesting the other driving mode may be rejected when the other driving mode is infeasible or unsafe.

In general, in one aspect, a vehicle comprising: (1) driving components including an acceleration component, a steering component, and a deceleration component; (2) autonomous driving capabilities to issue signals to the driving components to drive the vehicle in an autonomous driving mode; (3) manual driving capabilities to enable the driving components to be used to drive the vehicle in a manual driving mode; and (4) a supervisory component to issue signals to cause the vehicle to be driven only in the autonomous driving mode, only in the manual driving mode, or only in a predefined other driving mode.

In some implementations, the supervisory component may comprise elements on board the vehicle. The elements of the supervisory component that are on board the vehicle may comprise only a portion of the elements of the supervisory component.

In some implementations, the vehicle may comprise wireless communication components configured to carry data and commands to and from a central server.

In some implementations, the supervisory component may be configured to issue the signals based on information from sensors that detect conditions of the vehicle, based on information about one or more occupants of the vehicle, based on information about an environment of the vehicle, based on a preference of one or more of occupants, based on an identity of one or more of occupants, based on a license to manually drive the vehicle, or based on a physical condition of one or more of occupants, based on a degree of danger associated with a driving environment of the vehicle, based on presence on board the vehicle of an occupant who has a preference for one of the driving modes, based on sensors configured to sense a condition on board the vehicle, based on a presence of an occupant in a driver's seat of the vehicle, based on a degree of danger associated with one or more parcels on board the vehicle, based on a data source not on board the vehicle, based on a booking, based on a command from a remote operator, based on profile information of an occupant of the vehicle, based on one or more autonomous driving capabilities being disabled or enabled, based on a driving environment of the vehicle, or based on combinations of them. In some cases, the physical condition may comprise a condition requiring emergency medical care.

In some implementations, the supervisory component may be configured to smooth a speed of the vehicle transitioning from a current driving mode and a next driving mode, to evaluate a trajectory towards a goal position under a next driving mode, to evaluate authentication of one or more occupants under a next driving mode, to recommend a next driving mode, to infer one or more intermediate driving modes between a current driving mode and a next driving mode, to use a probabilistic model to optimally determine a next driving mode, or to reject switching to a next driving mode when the next driving mode is infeasible or unsafe, or to perform combinations of them.

In general, in one aspect, an apparatus (e.g., an interface) comprises: (1) a storage for instructions, and (2) a processor to operate in accordance with the instructions to analyze information about a vehicle or an occupant or a driving environment and cause the vehicle to transition from a current driving mode comprising one of (a) an autonomous driving mode, (b) a manual driving mode, or (c) another predefined driving mode, to a next driving mode comprising one of (a), (b), or (c). In some implementations, the apparatus may comprise a display.

In some implementations, the display may be configured to present a current driving mode of the vehicle, to present a list of possible next driving modes, to present a current condition of the vehicle or an occupant or a driving environment, to allow the user to indicate a condition of the vehicle or an occupant or a driving environment, to allow the user to indicate a medical emergency of an occupant of the vehicle, to allow the user to indicate an identity of an occupant of the vehicle, to allow the user to indicate a special need of an occupant of the vehicle, to allow the user to indicate a degree of danger associated with a driving environment of the vehicle, to present information of one or more autonomous driving capabilities, or to allow the user to enable or disable one or more autonomous driving capabilities, or to perform combinations of them.

In some implementations, a current driving mode comprises a manual driving mode and the next driving mode comprises an autonomous driving mode; a current driving mode comprises an autonomous driving mode and the next driving mode comprises a manual driving mode; a current driving mode comprises a manual driving mode and the next driving mode comprises a paused driving mode; a current driving mode comprises an autonomous driving mode and the next driving mode comprises a paused driving mode; or a current driving mode comprises an autonomous driving mode and the next driving mode comprises a disabled driving mode; or combinations of them.

In some implementations, the display may allow to choose a sequence of driving modes.

In general, in one aspect, an apparatus (e.g., a mixed-mode controller of a vehicle) comprises a processor analyzing information about a vehicle or an occupant or a driving environment and causing the vehicle to transition from a current driving mode in one of (a) an autonomous driving mode, (b) a manual driving mode, or (c) another predefined driving mode, to a next driving mode in (a), (b), or (c).

Implementations of the apparatus may include analyzing the information that may comprise analyzing a preference of one or more of the occupants for operation of the vehicle in one of the modes (a), (b), or (c).

In some implementations of the apparatus, analyzing the information may comprise analyzing a physical condition of one or more of the occupants; The physical condition may comprise a condition requiring emergency medical care.

In some implementations of the apparatus, analyzing the information may comprise analyzing the information comprises analyzing an identity of one or more of the occupants, analyzing a license to manually drive the vehicle, analyzing an impaired ability to manually drive, analyzing a degree of danger associated with one or more parcels on board the vehicle, analyzing a degree of danger associated with a driving environment of the vehicle, analyzing the presence on board the vehicle of an occupant who has a preference for one of the driving modes, analyzing if one or more autonomous driving capabilities is disabled or enabled, or analyzing a presence of an occupant in a driver's seat of the vehicle, or combinations of them.

In some implementations of the apparatus, the processor may operate according to the instructions stored in the storage to receive information from sensors configured to sense a condition on board the vehicle, or from a data source not on board the vehicle, or both. The processor may receive information about a booking to use the vehicle, or about profile information for an occupant for the vehicle, or both. In some implementations, the processor may receive a command from a remote operator to cause the vehicle to transition.

In some implementations of the apparatus, the current driving mode comprises a manual driving mode and the next driving mode comprises an autonomous driving mode; or, the current driving mode comprises an autonomous driving mode and the next driving mode comprises a manual driving mode; or, the current driving mode comprises a manual driving mode and the next driving mode comprises a paused driving mode; or, the current driving mode comprises an autonomous driving mode and the next driving mode comprises a paused driving mode; or, the current driving mode comprises an autonomous driving mode and the next driving mode comprises a disabled driving mode; or, combinations of them.

In some implementations of the apparatus, causing the vehicle to transition may comprise smoothing a speed of the vehicle across the current driving mode and the next driving mode, evaluating a trajectory towards a goal position under the next driving mode, evaluating authentication of the one or more occupants under the next driving mode, recommending the next driving mode, inferring one or more intermediate driving modes between the current driving mode and the next driving mode, using a probabilistic model to optimally determine the next driving mode, or rejecting a next driving mode that is infeasible or unsafe, or combinations of them.

In general, in one aspect, a computing device (e.g., a computer, a generic server, a specific server for mixed-mode driving) comprises: (1) a storage for instructions; (2) a network interface (e.g., wireless, or wired, or both) in communication with a vehicle; and (3) a processor to operates according to the instructions stored in the storage to analyze information about the vehicle or a user of the vehicle or a driving environment of the vehicle and transmit a command to the vehicle to transition from a current driving mode comprising one of (a) an autonomous driving mode, (b) a manual driving mode, or (c) another predefined driving mode, to a next driving mode comprising one of (a), (b), or (c).

Implementations of the computing device may include analyzing a preference of one or more of the occupants for operation of the vehicle in one of the modes (a), (b), or (c).

Implementations of the computing device may include analyzing a physical condition of one or more of the occupants. The physical condition may comprise a condition requiring emergency medical care.

In some implementations of the computing device, analyzing the information may comprise analyzing an identity of one or more of the occupants, analyzing a license to manually drive the vehicle, analyzing an impaired ability to manually drive, analyzing a degree of danger associated with one or more parcels on board the vehicle, analyzing a degree of danger associated with a driving environment of the vehicle, analyzing the presence on board the vehicle of an occupant who has a preference for one of the driving modes, or analyzing a presence of an occupant in a driver's seat of the vehicle, or combinations of them.

In some implementations of the computing device, the processor may operate in accordance with the instructions to receive information from sensors configured to sense a condition on board the vehicle, or from a data source not on board the vehicle, or both. The processor may receive information about a booking to use the vehicle, about profile information for an occupant for the vehicle, or both. The processor may receive a command from a remote operator to cause the vehicle to transition.

In some implementations of the computing device, analyzing the information may comprise analyzing one or more autonomous driving capabilities being disabled or enabled, smoothing a speed of the vehicle across the current driving mode and the next driving mode, evaluating a trajectory towards a goal position under the next driving mode, evaluating authentication of the one or more occupants under the next driving mode, recommending the next driving mode, inferring one or more intermediate driving modes between the current driving mode and the next driving mode, or using a probabilistic model to optimally determine the next driving mode, or combinations of them.

In some implementations of the computing device, the current driving mode comprises a manual driving mode and the next driving mode comprises an autonomous driving mode; or, the current driving mode comprises an autonomous driving mode and the next driving mode comprises a manual driving mode; or, the current driving mode comprises a manual driving mode and the next driving mode comprises a paused driving mode; or, the current driving mode comprises an autonomous driving mode and the next driving mode comprises a paused driving mode; or, the current driving mode comprises an autonomous driving mode and the next driving mode comprises a disabled driving mode, or combinations of them.

Implementations of the computing device may be realized on board the vehicle, or remote to the vehicle, or both.

These and other aspects, features, and implementations can be expressed as methods, apparatus, systems, computing devices, components, program products, methods of doing business, means or steps for performing a function, and in other ways.

These and other aspects, features, and implementations will become apparent from the following descriptions, including the claims.

DESCRIPTION

Figure 1:
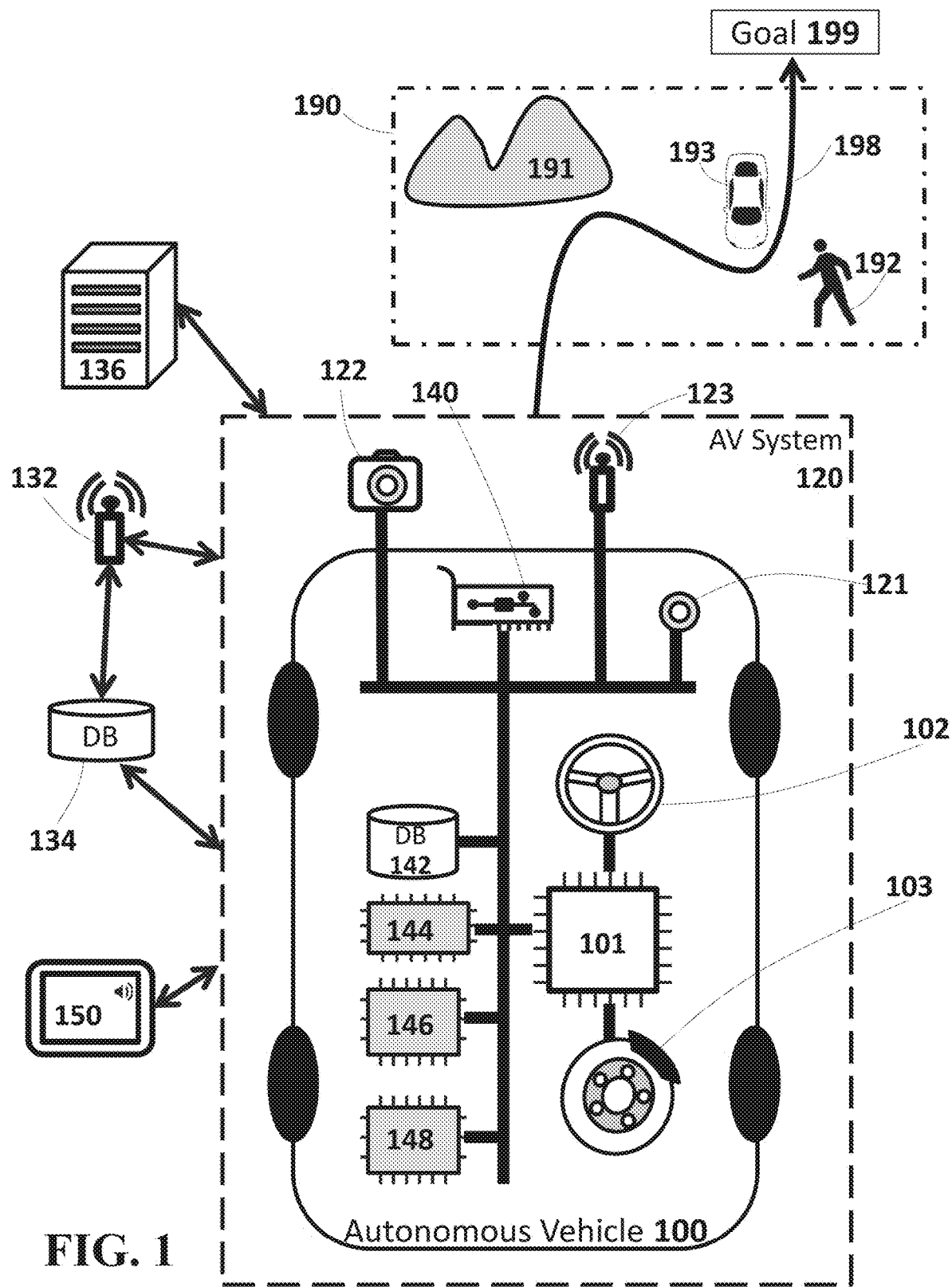
FIG. 1 is a block diagram of an AV system.

The term "autonomous driving capability" is used broadly to include, for example, any function, feature, or facility that can participate in the driving of an AV other than by a person manipulating a steering wheel, accelerator, brake, or other physical controller of the AV. This document sometimes uses the abbreviation "AV" to refer to a vehicle having one or more autonomous driving capabilities.

The term "manual driving capabilities" is used broadly to include, for example, any function, feature, or facility of a vehicle that is operated by a person, such as by manipulating a steering wheel, accelerator, brake, or other physical controller of the vehicle.

The term "driving mode" is used broadly to include, for example, autonomous or manual driving modes or non-driving modes such as parked or disabled, and any other mode in which the AV system may be driven or prevented from being driven, and also any combination of manual driving capabilities or autonomous driving capabilities that may be used during any of the driving modes or non-driving modes.

The terms "fully autonomous mode driving" and "fully autonomous driving mode" are used broadly to include, for example, any driving of a vehicle using only autonomous driving capabilities.

The term "partially autonomous mode driving" and "partially autonomous driving mode" are used broadly to include, for example, any driving of a vehicle using both autonomous driving capabilities and manual driving capabilities.

The term "fully manual mode driving" and "fully manual driving mode" are used broadly to include, for example, any driving of a vehicle using only manual driving capabilities.

The term "partially manual mode driving" and "partially manual driving mode" are used broadly to include, for example, any driving of a vehicle using both autonomous driving capabilities and manual driving capabilities.

The term "mixed-mode driving" is used broadly to include, for example, any driving of a vehicle that, at least at times, includes the use of one or more autonomous vehicle capabilities, and, at least at times, includes the use of manual driving capabilities. Mixed mode driving can include, at least at times, each of fully autonomous mode driving, partially autonomous mode driving, and fully manual mode driving.

The term "trajectory" is used broadly to include, for example, any path or route from one place to another; for instance, a path from a pickup location to a drop off location.

The term "goal" or "goal position" is used broadly to include, for example, any place to be reached by an AV, including, for example, an interim drop-off location, a final drop-off location, or a destination, among others.

The term "configure" is used broadly to include, for example, control, select, recommend, or require, among other things.

AV System

This document describes technologies applicable to any vehicles that have one or more autonomous driving capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). Autonomous driving capabilities may attempt to control the steering or speed of the vehicles. The technologies described in this document also can be applied to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). One or more of the Level 1, 2, 3, 4 and 5 vehicle systems may automate certain vehicle operations (e.g., steering, braking, and using maps) under certain driving conditions based on processing of sensor inputs. The technologies described in this document can benefit vehicles in any levels, ranging from fully autonomous vehicles to human-operated vehicles.

As shown in FIG. 1, a typical activity of an AV 100 is to safely and reliably drive autonomously or partially manually or both along a trajectory 198 through an environment 190 toward a goal location 199 while avoiding objects (e.g., barriers 191, vehicles 193, pedestrians 192, cyclists, and other obstacles) and obeying rules of the road (e.g., rules of operation or driving preferences). The features, functions, and facilities of an AV 100 or an AV system 120 that enable the AV 100 to perform the autonomous driving often are referred to as autonomous driving capabilities.

The driving of an AV 100 typically is supported by an array of technologies (e.g., hardware, software, and stored and real-time data) that this document together (and with the AV 100) refers to as an AV system 120. In some implementations, one or some or all of the technologies are on board the AV 100. In some cases, one or some or all of the technologies are at another location such as at a server (e.g., in a cloud computing infrastructure). Components of an AV system 120 can include one or more or all of the following (among others).

1. Functional devices 101 of the AV 100 that are instrumented to receive and act on commands for driving (e.g., steering 102, acceleration, deceleration, gear selection, and braking 103) and for auxiliary functions (e.g., turning signal activation) from one or more computing processors 146 and 148.
2. Data storage units 142 or memory 144 or both for storing machine instructions or various types of data or both.
3. One or more sensors 121 for measuring or inferring, or both, properties of the AV's state or condition, such as the AV's position, linear and angular velocity and acceleration, and heading (e.g., an orientation of the leading end of the AV). For example, such sensors can include, but are not limited to: GPS; inertial measurement units that measure both vehicle linear accelerations and angular rates; individual wheel speed sensors for measuring or estimating individual wheel slip ratios; individual wheel brake pressure or braking torque sensors; engine torque or individual wheel torque sensors; and steering wheel angle and angular rate sensors.
4. One or more sensors for sensing or measuring properties of the AV's environment. For example, such sensors can include, but are not limited to: monocular or stereo video cameras 122 in the visible light, infrared or thermal (or both) spectra; lidar 123; radar; ultrasonic sensors; time-of-flight (TOF) depth sensors; speed sensors; and temperature and rain sensors.
5. One or more communications devices 140 for communicating measured or inferred or both properties of other vehicles' states and conditions, such as positions, linear and angular velocities, linear and angular accelerations, and linear and angular headings. These devices include Vehicle-to-Vehicle (V2V) and Vehicle-to-Infrastructure (V2I) communication devices and devices for wireless communications over point-to-point or ad hoc networks or both. The communications devices 140 can communicate across the electromagnetic spectrum (including radio and optical communications) or other media (e.g., air and acoustic media).
6. One or more communication interfaces 140 (e.g., wired, wireless, WiMAX, Wi-Fi, Bluetooth, satellite, cellular, optical, near field, or radio, or combinations of them) for transmitting data from a remotely located database 134 to the AV system 120, transmitting sensor data or data related to driving performance to a remotely located database 134, or transmitting information that relates to teleoperations, or a combination of them.
7. One or more data sources 142 for providing historical, or real-time, or predictive information, or a combination of any two or more of them about the environment 190, including, for example, maps, driving performance, traffic congestion updates or weather conditions. Such data may be stored on a data storage unit 142 or memory 144 on the AV 100, or may be transmitted to the AV 100 via a communications channel from a remote database 134 or a combination of them.
8. One or more data sources 136 for providing digital road map data from GIS databases, potentially including one or more of the following: high-precision maps of the roadway geometric properties; maps describing road network connectivity properties; maps describing roadway physical properties (such as traffic speed, traffic volume, the number of vehicular and cyclist traffic lanes, lane width, lane traffic directions, or lane marker types and locations, or combinations of them); and maps describing the spatial locations of road features such as crosswalks, traffic signs or other travel signals of various. Such data may be stored on a memory 144 on the AV 100, or transmitted to the AV 100 via a communications channel from a remotely located database server 134, or a combination of the two.
9. One or more data sources 134 or sensors 132 for providing historical information about driving properties (e.g., speed and acceleration profiles) of vehicles that have previously traveled along local road sections, for example, at similar times of day. Such data may be stored on a memory 144 on the AV 100, or transmitted to the AV 100 via a communications channel from a remotely located database 134, or a combination of the two.
10. One or more computing devices 146 and 148 located on the AV 100 (or remotely or both) for executing algorithms for on-line generation of control actions based on both real-time sensor data and prior information, allowing the AV system 120 to execute its autonomous driving capabilities.
11. One or more processes for processing sensor data, perceiving the environment, understanding conditions that are currently presented by and may at future times be presented by the perceived environment, performing trajectory planning, performing motion control, and making decisions based on those perceptions and understandings. A process may be implemented by integrated circuits, field-programmable gate arrays, hardware, software, or firmware, or a combination of two or more of them.

12. One or more interface devices 150 (e.g., displays, mice, track balls, keyboards, touchscreens, mobile devices, speakers, biometric readers, and gesture readers) coupled to the computing devices 146 and 148 for providing information and alerts to, and receiving input from, a user (e.g., an occupant or a remote user) of the AV 100. The coupling may be wireless or wired. Any two or more of the interface devices may be integrated into a single device.

Mixed-Mode Driving

AV systems that operate in a fully autonomous driving mode typically either do not require or do not permit the AV systems to be operated, for example, in a fully manual driving mode. This document describes mixed-mode driving and mixed-mode driving systems, at least some implementations of which offer an occupant of an AV an option of being driven in a fully or partially autonomous driving mode or in a fully or partially manual driving mode. In some implementations, the mixed-mode driving may at times allow the occupant to drive manually. In some instances of mixed-mode driving, the AV system may permit the occupant to engage in one or more or a combination of driving modes. In some cases, the AV system may require the occupant or the AV or both to engage only in one or more particular driving modes, while precluding one or more selected other driving modes.

In some implementations, the AV system with mixed-mode driving capabilities may permit or require a transition of its driving mode from one to another. The transition may be based on automatic detection, an occupant request, or a server command, or combinations of them. The flexibility of driving mode transition of an AV system offers more options for an AV system user and provides a more efficient usage of the AV system.

Figure 2:
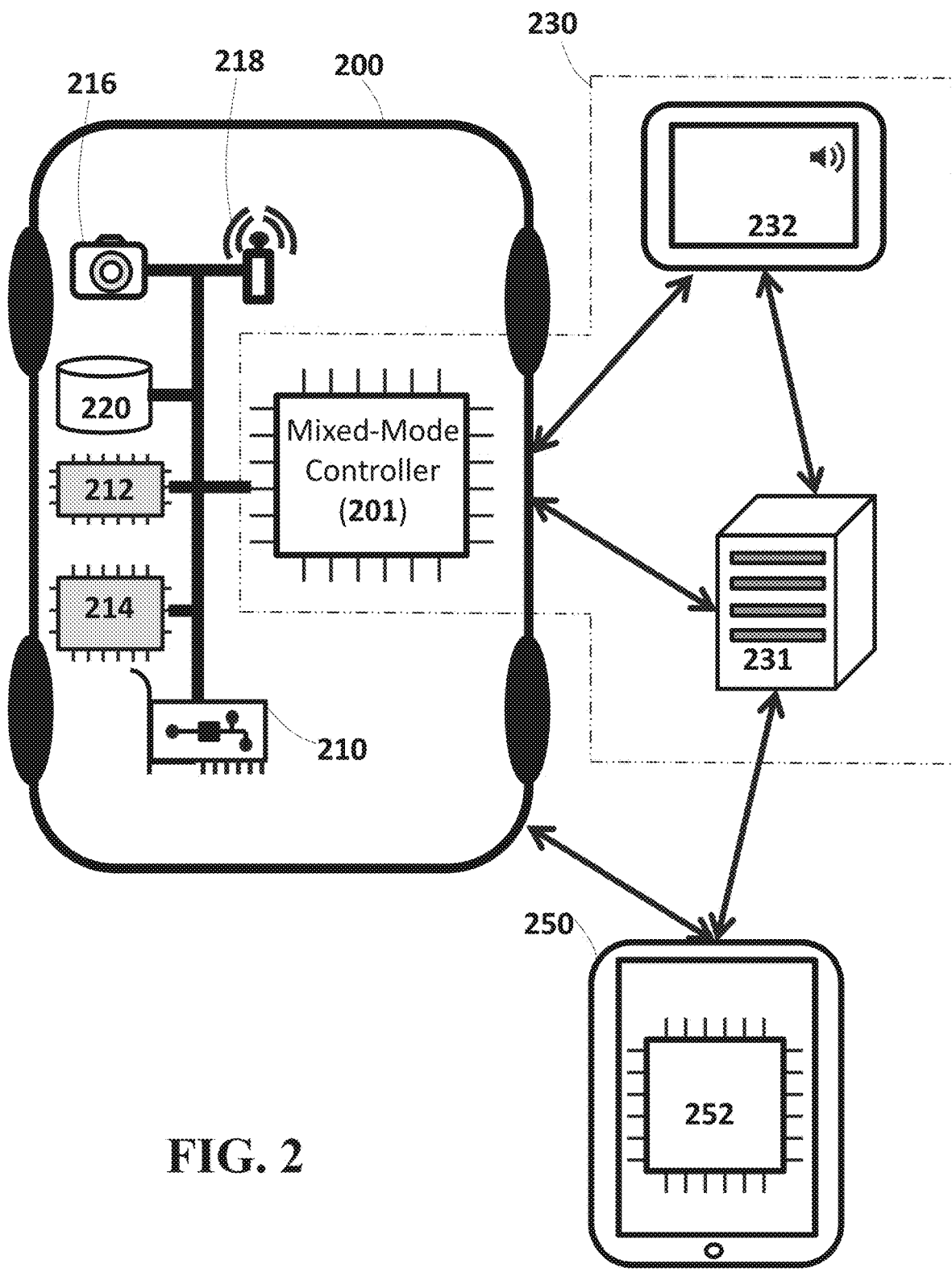
FIGS. 2 and 3 are block diagrams of mixed-mode driving systems.

A mixed-mode driving system (we sometimes refer to one or more AV systems that permit or require mixed-mode driving as "mixed-mode driving systems") may include one or more AVs and the AV systems of which they are part (we sometimes use the terms "AV" and "AV system" interchangeably although in some implementations, the AV is only a part of an AV system). FIG. 2 illustrates an example of an architecture of a mixed-mode driving system 230. In some implementations, a mixed-mode driving system 230 may include one or more of the following elements (among others):

A mixed-mode controller 201, which may be realized by integrated circuits, field-programmable gate arrays, hardware, software, or firmware, or a combination of two or more of them.

In some implementations, the mixed-mode controller 201 may be installed on the AV system 200. The mixed-mode controller 201 may interact with one or more components of the AV system 200 (e.g., sensors 216 and 218, communication devices 210, user interface devices, memory 212, a processor 214, a database 220, or a functional device, or combinations of them). The mixed-mode controller 201 may, for example, send and receive information and commands. The mixed-mode controller 201 can communicate over a communication interface 210 (that may be at least partly wireless) with a mixed-mode driving server 231.

In some implementations, the mixed-mode controller 252 may be installed on a mobile device (e.g., a smartphone) 250 or a mixed-mode driving server 231. The mixed-mode controller 252 may interact with one or more components of the AV system 200 (e.g., sensors 216 and 218, communication devices 210, user interface devices, memory 212, a processor 214, a database 220, or functional devices, or combinations of them). The mixed-mode controller 252 may utilize signals collected by the sensors of the mobile device 250, such as GPS sensors, cameras, accelerometers, gyroscopes, and barometers. The mixed-mode controller 252 can communicate with a mixed-mode driving server 231 over a communication interface of the mobile device 250.

In some implementations, the mixed-mode controller 201 may be installed on a combination of the AV system (in particular on the AV itself), a mobile device 250, a mixed-mode driving server 231, or other elements of the AV system.

A mixed-mode driving server 231, may be located in the AV of the AV system 200 or in a remote location, for example, at least 0.1, 1, 2, 3, 4, 5, 10, 20, 30, 40, 50, 100, 200, 300, 400, 500, 600, 700, 800, 900, or 1000 meters away from the AV of the AV system 200, or in a combination of the AV and the remote location. The mixed-mode driving server 231 communicates with the mixed-mode controllers 201 and 252.

In some implementations, the mixed-mode driving server 231 may communicate with a mobile device 250 to receive a request to use the AV system 200.

A user interface 232 may be presented by the mixed-mode controller 201 or by the mixed-mode driving server 231 or by both. Implementations may present on the interface 232 information of one or more of the following: configuring a driving mode, switching driving modes, a hazard request, a stop request, a teleoperation request, a road network, a condition of the AV of the AV system 200, an environment of the AV of the AV system 200, or sensor signals, or combinations of them, among other things. The user interface can be presented in the inside of the AV, on the outside of the AV, on the mobile device 250, or in other locations or combinations of these.

Figure 3:
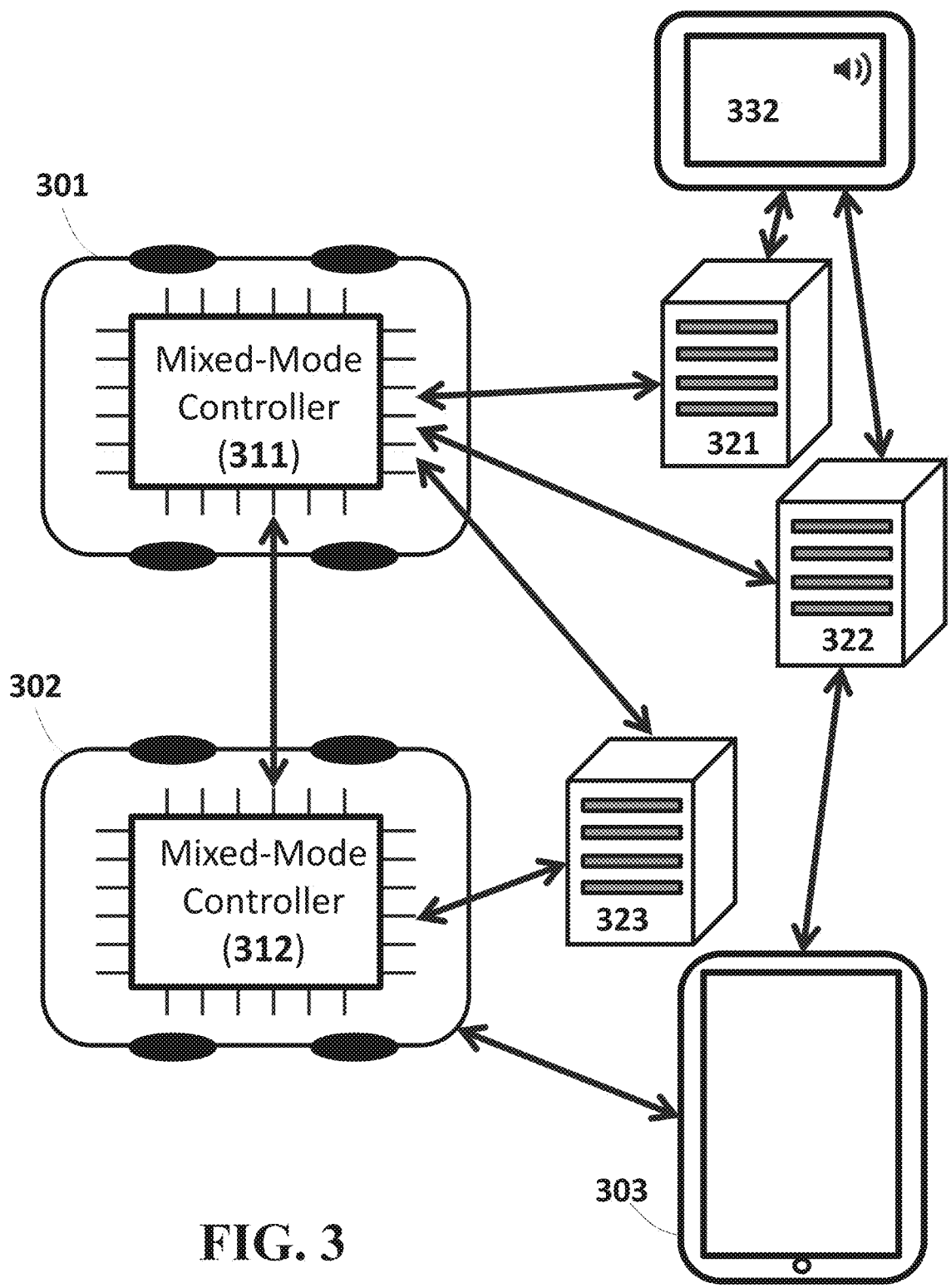

Referring to FIG. 3, in some implementations, a mixed-mode controller 311 may communicate with two or more mixed-mode driving servers 321, 322 and 323. In some cases, two or more servers (e.g., 321 and 322) receive, aggregate, process, and deliver information for mixed-mode driving or for presentation on an interface 332. In some implementations, a server (e.g., 323) may receive information from two or more mixed-mode controllers 311 and 312, which are installed, for example, on different AV systems 301 and 302, respectively. Some implementations allow a server (e.g., 322) to receive, aggregate, process and deliver information from and to two or more mixed-mode controllers 311 and 313, which are installed on an AV system 301 and a standalone device (e.g., a mobile device 303), respectively.

In some implementations, a mixed-mode controller (e.g., 312) may play a role as a server by receiving, aggregating, processing, and delivering information from or to one or more other mixed-mode controllers (e.g., 311 or 313, or both). In some implementations, a mixed-mode controller (e.g., 312) may play a role as a relaying device for establishing and maintaining a communication between a server 323 and another mixed-mode controller 311.

The mixed-mode driving system has advantages over other transportation systems (e.g., taxis, buses, shared vehicles or rented vehicles) such as those that require occupants or operators or drivers to drive vehicles (i.e., to use a fully manual or partially manual driving mode or fully autonomous) at all times and can be expensive or inconvenient. Implementations of the mixed-mode driving system described in this document may exploit autonomous driving capabilities to provide more efficient transportation services. In examples of the mixed-mode driving system, an AV system may be operated in different driving modes (e.g., fully autonomous driving mode, partially autonomous driving mode, fully manual driving mode, partially manual driving mode, and mixed-mode driving) and can readily switch among driving modes. Because the AV system may be operated in fully autonomous mode driving, partially autonomous mode driving, fully manual mode driving, partially manual mode driving, or mixed-mode driving, the mixed-mode driving system can maximize the efficiency of vehicle usage. For example, when the AV system needs maintenance or repair, it may drive autonomously to a service center without a driver being on board. In some implementations, the AV system may drive autonomously to pick up an occupant. In some instances, after the AV system drops off its occupant, it may drive autonomously to a parking space.

In some implementations, the mixed-mode driving system can offer flexible or safer vehicle operations. For example, a driver operating a vehicle for a long time in fully manual driving mode or partially manual driving mode may become distracted or fatigued, and the mixed-mode controller may switch the vehicle to fully autonomous mode driving or partially autonomous mode driving so that the driver can take a rest or safely pay attention to the distraction.

In some implementations, the mixed-mode driving system may avoid dangers. For example, when hazardous substances (e.g., flammables, weapons and bombs) are detected inside the AV system, the mixed-mode controller may switch the AV system into fully autonomous mode driving, and then into a disabled mode that prohibits further driving. In some instances, when a driver is detected in a medically emergent condition, the mixed-mode controller may switch (e.g., force) the AV system into emergency mode driving, in which the AV operates in fully autonomous mode driving to drive to an emergency room.

Mixed-Mode Controller

The AV system may comprise one or more mixed-mode controllers. The mixed-mode controller may control, configure, select, recommend or require the AV system's driving mode, which can, for example, be (1) fully autonomous mode driving, or (2) fully manual mode driving by an occupant using the manual driving capabilities, or (3) a combination of partially autonomous mode driving and partially manual mode driving, among others.

As part of the general control of the driving mode of the AV, the mixed-mode controller can control, configure, select, recommend or require the availability and use of one or more specific autonomous driving capabilities and one or more specific manual driving capabilities, or a combination of them.

Figure 4:
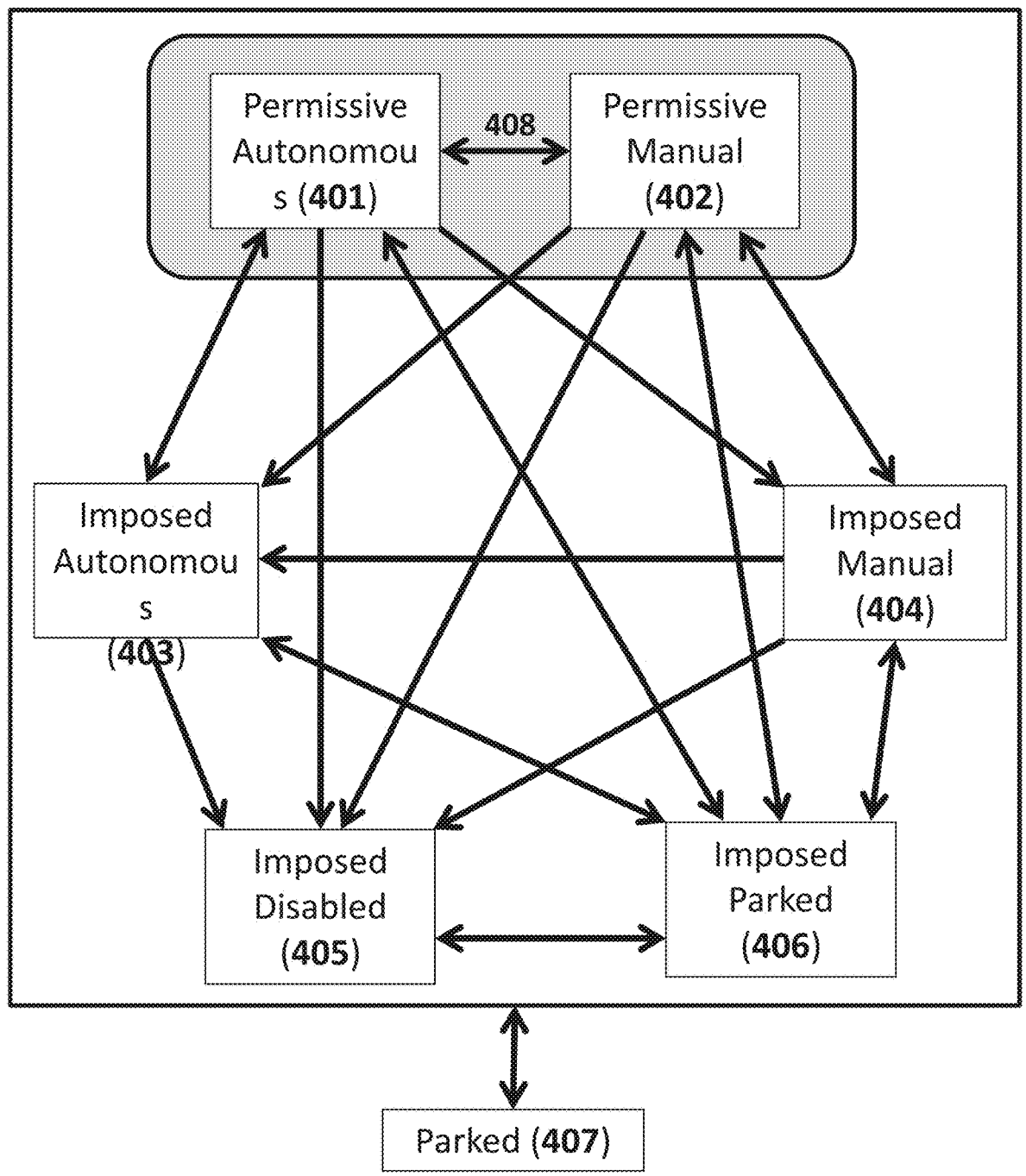
FIG. 4 is a block diagram of mixed-mode driving.

FIG. 4 (a state transition diagram) shows implementations in which the mixed-mode controller may configure, control, select, recommend, or require one or more (or a succession of) driving modes to be used by the AV system, each of which may be either permissive or imposed. The figure illustrates the following driving modes and uses arrows to indicate permitted transitions between driving modes: permissive autonomous 401, permissive manual 402, imposed autonomous 403, imposed manual 404, imposed disabled 405, imposed parked 406, and parked 407.

In some implementations, a transition not represented by an arrow in FIG. 4 is feasible. For example, any driving mode can be transitioned to any of other modes.

Implementations of the permissive autonomous mode 401 may allow the AV system to operate in a fully autonomous driving mode or a partially autonomous driving mode. The permissive manual mode 402 may allow the AV system to operate in a fully manual driving mode or a partially manual driving mode. The mixed-mode controller may cause transitions 408 between the permissive autonomous mode 401 (fully autonomous or partially autonomous) and the permissive manual mode 402 (fully manual or partially manual). In some implementations, the transition 408 may be based on a request of a user (e.g., an occupant, a driver, or a remote user) of the AV system, or a request from a mixed-mode driving server, or a request from the mixed-mode controller, or a combination of them. For example, an occupant may initially ride the AV system in a fully autonomous driving mode, but due to one or more reasons (e.g., due to discomfort of the driving behavior of the fully autonomous driving mode) he may want to request the AV system to switch to a fully manual or partially manual driving mode. In some instances, an occupant may drive the AV system in a fully manual driving mode; he may request or cause a switch to a partially or fully autonomous driving mode and, within the partially or fully autonomous driving mode, the driver may request or specify one or more of the autonomous driving capabilities that he wishes to be used.

In some implementations, the mixed-mode controller may configure the AV system to operate in an imposed autonomous mode 403, in which only the autonomous driving capabilities can be used, or only one or more specified autonomous driving capabilities can be used. In some implementations, the mixed-mode controller may configure the AV system to operate in an imposed manual mode 404, in which only the manual driving capabilities can be used, or only one or more specified manual driving capabilities. In some implementations, the mixed-mode controller may configure the AV system to operate in an imposed disabled mode 405, in which the AV system is disabled for driving; in other words, it cannot be driven in the disabled mode. In some implementations, the mixed-mode controller may configure the AV system to operate in an imposed parked mode 406, in which the AV system must be in a parked condition and any movement from the parked condition is prohibited.

Generally, when the AV system is in an imposed driving mode or disabled mode or parked mode, the AV system will not change the AV system's driving mode in response to actions of an occupant. However, the mixed-mode controller may be influenced by the occupant, although the AV system is not commanded by the occupant. In some implementations, the mixed-mode controller may monitor the behavior of the occupant. For example, when the AV system is in the imposed driving mode, and an occupant may express discomfort or may be detected to be uncomfortable (e.g., motion sickness) about the AV driving behavior, the mixed-mode controller may evaluate the feasibility of switching to another driving mode (e.g., permissive autonomous, permissive manual, imposed manual, or imposed parked), and if feasible the mixed-mode controller may execute the transition to another driving mode.

In some implementations, the mixed-mode controller may configure the AV system in a parked mode 407, which pauses the driving of the AV system. For example, when being powered on, the AV system is initially in a parked mode 407. In some instances, the AV system may have been driving to a goal position, and is then placed in a parked mode 407.

As mentioned above, in some implementations, the mixed-mode controller may transition the AV system from one driving mode to another. For instance, FIG. 4 shows that the permissive autonomous mode 401 can transition to permissive manual mode 402. In some implementations, the AV system may transition from the permissive autonomous mode 401 to, for example, the imposed autonomous mode 403, the imposed manual mode 404, the imposed disabled mode 405, the imposed parked mode 406, or parked mode 407.

In some implementations, the permissive manual mode 402 may transition to, for example, the permissive autonomous mode 401, the imposed autonomous mode 403, the imposed manual mode 404, the imposed disabled mode 405, the imposed parked mode 406, or the parked mode 407.

In some implementations, the imposed autonomous mode 403 may transition to, for example, the permissive autonomous mode 401, the imposed disabled mode 405, the imposed parked mode 406, or the parked mode 407.

In some implementations, the imposed manual mode 404 may transition to, for example, the permissive manual mode 402, the imposed autonomous mode 403, the imposed disabled mode 405, the imposed parked mode 406, or the parked mode 407.

In some implementations, the imposed disabled mode 405 may transition to, for example, the imposed parked mode 406, or the parked mode 407.

In some implementations, the imposed parked mode 406 may transition to, for example, the permissive autonomous mode 401, the permissive manual mode 402, the imposed autonomous mode 403, the imposed manual mode 404, the imposed disabled mode 405, or the parked mode 407.

In some implementations, the parked mode 407 may transition to, for example, the permissive autonomous mode 401, the imposed autonomous mode 403, the imposed manual mode 404, the imposed disabled mode 405, or the imposed parked mode 406.

These transitions are indicated by arrows in FIG. 4. More complicated systems are possible in which other driving modes can be selected and transitions made among them, and in which transitions among the uses of specific selected sets of autonomous driving capabilities or manual driving capabilities or both are permitted or required.

Mode Transition

The mixed-mode controller may analyze acquired information to determine which transitions may or must be made from one driving mode or non-driving mode (e.g., disabled or parked) to another, when such transitions should or must be made, and when and how sequences of such transitions should or must be made, among other features of the transitions.

Figure 5:
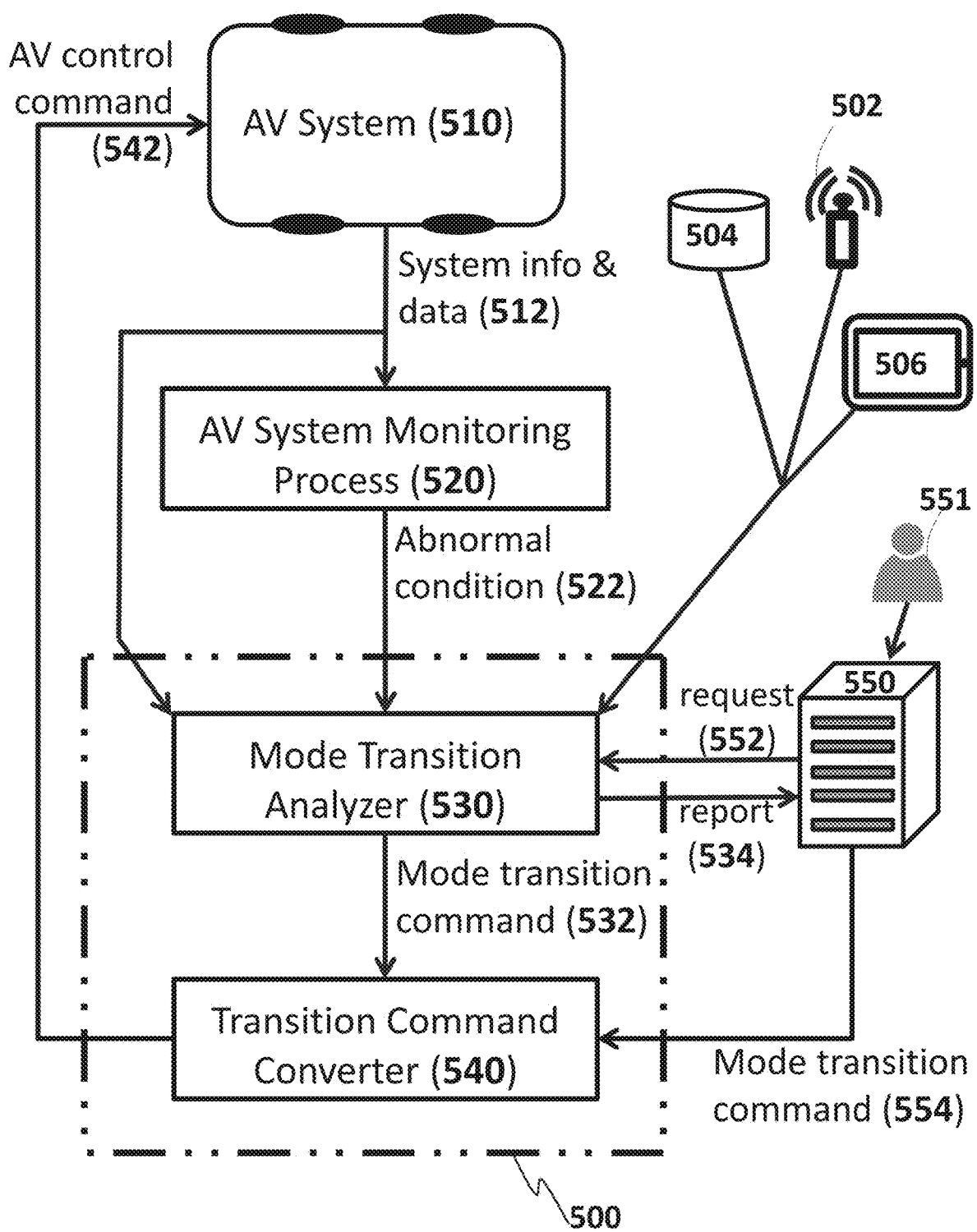
FIG. 5 is a processing flow for mixed-mode driving.

Referring to FIG. 5, the mixed-mode controller 500 may comprise a mode transition analyzer 530 and a transition command converter 540. Information sources for mode transition may include, for example, a sensor 502 (e.g., video cameras; LIDAR sensors; ultrasonic sensors; weight/pressure sensors on the seats and floor and in the trunk; X-ray sensors; chemical sensors; alcohol sensors; millimeter-wave imaging sensors; haptic sensors on the steering wheel or pedals; and eye trackers for occupant of the driver seat), a database 504 (e.g., map data, traffic data, infrastructure data, users, AV fleets, and insurance data), a user interface 506, a component of the AV system 510, a software process (e.g., perception, trajectory planning, motion control, and decision making), an AV system monitoring process 520, a mix-mode driving server 550, or a human, or combinations of them.

When the mixed-mode controller receives information (e.g., system information and data 512, an abnormal condition 522, a request 552), the mode transition analyzer 530 may evaluate the feasibility or desirability or necessity of mode transition and may determine the mode to which the AV system 510 should transition. When the analysis is done, a mode transition command 532 may be issued. In some cases, an analysis report 534 may be transferred to the mixed-mode driving server 550.

In some implementations, the mixed-mode driving server 550 may issue a mode transition command directly to the mixed-mode controller 500 without involvement by the occupant of the AV. For example, a fleet manager (which can be a human 551, or fleet management algorithms running on the mixed-mode driving server 550) may monitor a current environment of the AV system 510, and cause the mixed-mode driving server 550 to instruct the AV system to transition into another driving mode. For instance, the AV system 510 may drop off an occupant, and its driving mode can then be transitioned into the imposed autonomous mode.

When the transition command converter 540 receives a mode transition command 532, it will convert the mode transition command 532 into one or more AV control commands 542 or into a sequence of AV control commands 542. The AV system 510 may execute the AV control commands 542 and operate in the commanded driving mode.

In some implementations, the mode transition may comprise a single-step transition; for example, the AV system may transition from the permissive autonomous mode 401 to the imposed autonomous mode 403. In some implementations, the mode transition may comprise a multiple-step transition; for instance, the AV system may transition from the permissive manual mode 402, to the permissive autonomous mode 401, and to the imposed parked mode 406.

The mode transition analyzer 530 may determine transitions or sequences of transitions between and among driving modes based on one or more factors. Examples of the factors are described below.

Health condition of the AV system. The AV system 510 may comprise an AV system monitoring process 520, which may be a standalone process, or a part of the mixed-mode controller, or a part of mixed-mode driving server 550. Among other things, the AV system monitoring process 520 may monitor the health condition or other operational condition of the AV system 510, or the health condition or other operational condition of components of the AV system (e.g., a sensor, a computing device, a battery, an actuator, a tire, a steering wheel, a brake, a throttle, a headlight, a tail light, a controller, a data storage device, and an interface). Examples of the operational condition may include speed, orientation, acceleration, steering, data communications, perception, and trajectory planning.

The AV system monitoring process 520 may receive system information and data 512 to monitor the operational condition (e.g., speed, orientation, acceleration, steering, data communications, perception, and trajectory planning) of the AV system 510 or of one or more components of the AV system. The operational condition may be based on directly reading outputs of hardware components or software processes, or both, of the AV system 510, or indirectly inferring, e.g., computationally or statistically, the outputs by measuring associated quantities, or from inputs by an occupant of the AV system, or combinations of them. In some implementations, the AV system monitoring process 520 may derive information (e.g., computing a statistic, or comparing monitored conditions with knowledge in a database) from the operational condition. Based on the monitored operational condition or derived information or both, the monitoring process 520 may determine an abnormal condition 522, which has led, or will lead, to degraded or undesirable performance or a failure of the AV system 510. Examples of an abnormal condition include one or more or all of the following: a brake malfunction; a flat tire; the field of view of a vision sensor is blocked; a frame rate of a vision sensor drops below a threshold; an AV system's movement does not match a current steering angle, a throttle level, a brake level, or a combination of them; a fault software code; a reduced signal strength; an increased noise level; an unknown object perceived in the environment of the AV system 510; a motion planning process is unable to find a trajectory towards the goal due to a planning error; or inaccessibility to a data source (e.g., a database, a sensor, and a map data source), among others.

The existence of an abnormal condition 522 can be inferred. For example, in some implementations, the AV system monitoring process 520 may determine or infer an abnormal condition in the AV system 510 by pattern recognition. For example, one or more signal values received from the AV system 510 that are out of a normal pattern or a specified pattern may be determined as an abnormality. Patterns can be hand-crafted or deduced from data using machine learning approaches such as re-enforcement learning or deep learning.

In some implementations, the AV system monitoring process 520 may detect an abnormal condition 522 in the AV system 510 by a model-based approach. For example, a model of a monitored hardware component or software process is constructed and a current state of the model is estimated using past inputs or past measurements. When a measurement associated with the current state deviates from its estimate, an abnormal condition 522 may occur. For example, dynamic quantities (e.g., speed and orientation) of the AV system 510 with respect to throttle and steering commands is described in a dynamics model, and the monitoring process 520 uses the dynamics model to estimate the dynamic quantities at time t based on the throttle and steering commands at time t−1. When the measured dynamic quantities at time t differ from the estimated dynamic quantities by at least 1%, 2%, 3%, 4%, 5%, 10%, 15%, 20%, 25%, 30%, 35%, 40%, 45% or 50%, the monitoring process 520 determines an abnormal condition 522. A model may be hand-designed or identified using system identification approaches or learned using machine learning approaches (e.g., neural networks).

Occupant. In some implementations, the mixed-mode controller may evaluate preferences or characteristics or other status of an occupant who is on board or is planning to be on board the AV system. The preferences or characteristics or other status of the occupant may be provided by the occupant, or may be detected automatically, or both. The mixed-mode controller may analyze information from one or more sensors. For example, the AV system may comprise a sensor (e.g., a vision sensor, an acoustic sensor, an electric sensor, and pressure sensor) monitoring the interior of the AV system 510, and the mixed-mode controller may analyze signals (e.g., images, videos, sounds, pressures, voltages, and currents) to infer behaviors of the occupant, such as seat occupancy, gestures, facial expressions, noises, utterances, body movement, and actions.

In some implementations, the mixed-mode controller may access a database 504 of occupant records (e.g., driving history, social media, personal profiles, occupation, training, and crime database), and the mixed-mode controller may analyze the records to infer behaviors of occupant.

In some implementations, the mixed-mode controller may evaluate if an occupant is an authenticated occupant, or if an occupant has special permission to override a driving mode or to request a driving mode, or if an occupant needs special care, or if an occupant should be restricted to certain modes (e.g., an occupant without a valid driver license may not be allowed to manually drive the AV).

When a status of the occupant indicates that there is or may be a risky activity associated with an occupant, the mixed-mode controller may refuse to permit the occupant to control the AV system or may configure the AV system in a particular driving mode, such as the imposed autonomous mode 403, the imposed disabled mode 405, or the imposed parked mode 406, among others.

In some cases, the AV system may comprise a sensor measuring the intoxication level of an occupant. If the intoxication level is above a threshold, the mixed-mode controller may configure the AV system in a particular driving mode, such as the imposed autonomous mode 403, the imposed disabled mode 405, or the imposed parked mode 406, among others.

In some implementations, the mixed-mode controller may identify a medical emergency of an occupant driving the AV system, and the AV system may be configured in a particular driving mode, such as the imposed autonomous mode 403, the imposed disabled mode 405, or the imposed parked mode 406, among others.

In some implementations, the mixed-mode controller may determine a driving mode based on the lack of an occupant in the AV system. When there is no occupant and the AV system is instructed to drive towards a goal, the mixed-mode controller may configure the AV system in particular driving mode, such as the imposed autonomous mode 403 or the imposed parked mode 406, among others.

In some implementations, the mode transition may be executed upon a request of an occupant. For instance, an occupant may want to take over the control of the AV system, and he can instruct the mixed-mode controller to transition from one particular mode to another (e.g., from the permissive autonomous mode 401 to the permissive manual mode 402).

In some implementations, the mode transition may be executed upon activation or deactivation of one or more autonomous driving capabilities or of one or more manual driving capabilities. For example, when the AV system operates in an autonomous driving mode, an occupant may turn off a component of the perception process (e.g., traffic light detection, or sensing capability) and the deactivation may cause the mixed-mode controller to transition to a manual driving mode for safety reasons. For instance, a person may manually drive the AV system based on perception and trajectory planning processes, but he may activate the autonomous controller of the AV system, allowing or causing the mixed-mode controller to transition the manual driving to autonomous driving.

Onboard Objects.

Figure 9:
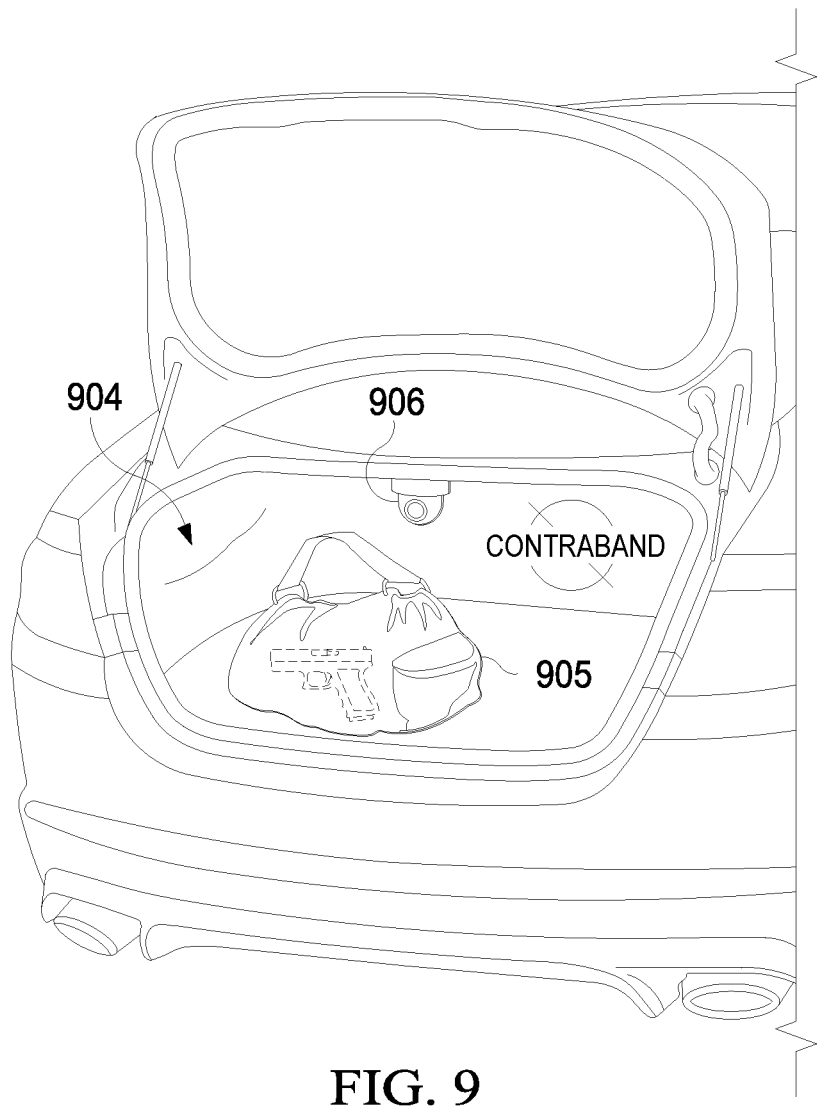
FIG. 9 shows a risky or dangerous object in a cargo area of a vehicle with a sensor for determining if the object is risky or dangerous.

FIG. 9 shows a risky or dangerous object 905 in a cargo area 904 (e.g., in a trunk) of a vehicle with a sensor 906 (e.g., a camera) for determining if the object 905 (e.g., a weapon) is risky or dangerous. In some implementations, the mixed-mode controller may evaluate characteristics or other status of an object (e.g., object 905) placed, or to be placed (e.g., for shipping), on board the AV system, such as in the cargo area 904. The AV system may comprise a sensor (e.g., sensor 906) to identify shapes or chemical or other compositions, or both, of the object, and the mixed-mode controller may analyze sensor data to infer characteristics or other status of the object. The AV system may access records of a person (e.g., sender, owner, carrier, or receiver) associated with the object (e.g., driving history, social media, personal profiles, occupation, training, and crime database), and the mixed-mode controller may analyze the records to infer a purpose of having the object on the AV system. When there is a risky object (e.g., bomb or weapon) on board or a risky purpose (e.g., going to a drug party, or shipping an object to a hazard zone), the mixed-mode controller may configure the AV system in a particular driving or non-driving mode, such as the imposed disabled mode 405 or the imposed parked mode 406, among others. When an object is a personal belonging or has no risk, the mixed-mode controller may configure the AV system in any preferred driving mode instructed by the person (e.g., sender, owner, carrier, or receiver) associated with the object.

In some implementations, the mixed-mode controller may determine a driving mode based on the lack of an object placed on board the AV system. When there is no object and no occupant, the mixed-mode controller may configure the AV system in a particular driving mode, such as the permissive autonomous mode 401 or the imposed autonomous mode 403 or the imposed parked mode 406, among others.

Server requests. A mixed-mode driving server 550 may send a mode transition request 552 to the mixed-mode controller. The request 552 may include various information. For example, the request may show a scenario (e.g., a crowd, a medical emergency, a protest, a detour, a risky event, a police action, an inclement weather condition, a construction, an electricity blackout, and an accident) of a location during a trajectory towards the goal; the AV system may analyze the scenario to determine if the current driving mode has to be transitioned into another mode or sequence of modes.

In some implementations, the AV system may be requested to pick up an occupant. In some implementations, the AV system may be requested to drive to a goal (e.g., returning to a service center) without an occupant.

Safety. In some implementations, when the AV system is moving, the mixed-mode controller may evaluate feasibility, desirability, or safety of the transition based on the current driving condition of the AV system. In some implementations, the priority is to guarantee that the transition will not cause a risk on or to the AV system, any occupants and surrounding objects (e.g., vehicles, pedestrians, and infrastructure objects), or does not break rules of the road, or both. In some cases, the mixed-mode controller may measure the current driving speed or turning angle, or both, and evaluate the driving speed after the transition; the mixed-mode controller may smooth a change in the driving speed across the transitioned modes. For example, the speed of the current driving mode (e.g., manual driving) may be 50 km/hr, and the mixed-mode controller may transition the AV system to another driving mode (e.g., imposed autonomous driving) whose preferred speed is 30 km/hr; however, a sharp speed reduction from 50 km/hr to 30 km/hr may cause a collision by a following vehicle, so the mixed-mode controller may reduce the speed gradually from 50 km/hr to 30 km/hr. For instance, the mode transition may slow down or stop the AV system to enable a subsequent driving mode to take over. Sometimes, the mode transition may be realized along with audio prompts, video detection, or occupant confirmation, or a combination of them.

When a driving mode includes one or more autonomous driving capabilities, the mode transition analyzer 530 may evaluate one or more or all of the following conditions by an algorithmically analyzing data provided by the sensors and other sources: (1) No human occupant is detected in the AV system 510. (2) The AV system 510 is not in motion. (3) A mode transition command (e.g., 532 or 554) may have been generated, regardless of an occupant being on board the AV system, to move from the current location to a new goal position. The AV might be moved to a new goal for a variety of reasons; for example, serving another booking or picking up an occupant; moving to a higher demand location or one where more booking requests are expected than at the current location; charging the vehicle (particularly relevant to electric vehicles); or vehicle maintenance. (4) The AV system 510 is capable of driving autonomously from its current location to the designated goal.

Driving environment. The mixed-mode controller may evaluate functional status of one or more processes for processing sensor data, perceiving the environment, understanding conditions that are currently presented by and may at future times be presented by the perceived environment, performing trajectory planning, performing motion control, and making decisions based on those perceptions and understandings. The mixed-mode controller may use outputs from a process (e.g., perception) of the AV system or a source of information about the driving environment to determine a driving mode of the AV system. The perception process may detect objects in the driving environment of the AV system and thus may require the mixed-mode controller to respond to a detected object. For example, the perception process may detect an ambulance approaching the AV system, and the mixed-mode controller may configure the AV system into a particular driving mode, such as the imposed autonomous mode 403 or in the imposed parked mode 406, among others; in some cases, the AV system may not find a safe-stopping place, and the mixed-mode controller may configure the AV system into the imposed manual mode 404.

In some instances, the perception process may detect an unknown object or unexpected event, and the mixed-mode controller may configure the AV system into a particular driving mode, such as the imposed parked mode 406; in some cases, the AV system may not find a safe-stopping place, and the mixed-mode controller may configure the AV system into a particular driving mode, such as the imposed manual mode 404.

The mode transition analyzer 530 may keep using the AV system monitoring process 520 or reading the system information and data 512 to monitor if one or more autonomous driving capabilities remains in a functional state. When the AV system is powered on, the mode transition analyzer 530 may analyze if the AV system is able to switch from the parked mode to a particular driving mode. During the driving mode, the goal position may be updated over time, and the mode transition analyzer 530 may evaluate if the current driving mode remains appropriate, safe, feasible, or desirable or if a mode transition should be considered or implemented. Once the AV system reaches its goal, the mode transition analyzer 530 may issue a command to configure the AV system 510 to transition into the imposed parked mode 406 or parked mode 407.

The mode transition analyzer 530 may consider, control, select, recommend, or require particular characteristics to be followed during a given driving mode. For example:

1. The AV system may be configured to drive at a particular speed or within a speed range, say, not faster than 20 km/hr, 40 km/hr, 60 km/hr, 80 km/hr or 100 km/hr, due to constraints in regulation or software processing speed. In some scenarios, the AV system should not drive so slowly that it blocks traffic. Thus, the AV system may be configured to drive at a speed or within a speed range, say, not slower than 20 km/hr, 40 km/hr, 60 km/hr, 80 km/hr or 100 km/hr.
2. The mode transition analyzer 530 may analyze data to avoid certain locations or areas, for example, to avoid driving the AV in areas known to be difficult or dangerous to drive based on an autonomous driving capability. For instance, the AV system may prefer not to drive on complex road configurations (e.g., roundabouts and 4-way stops) or highways. In some examples, some roads or intersections might be blacklisted because they are known to be complex or dangerous. On the other hand, following a longer path might not be acceptable with an occupant on board but might be acceptable when there is no occupant.
3. The AV system can use conservative decision-making strategies with respect to the selection of a driving mode or sequences of driving modes. For instance, the AV system may choose never to cross over to an opposing lane of traffic in order to pass a parked car. In some implementations, the AV system may choose to have the AV system stop when it sees an unidentified object. Some of these strategies might not be desirable with an occupant on board, as the occupant may feel less efficient or frustrated. However, such inefficiencies or frustrations may be acceptable when the AV system is configured in the autonomous driving mode or when there is no occupant on board the AV.
4. When an occupant is on board the AV system, a choice of driving mode or a choice of specific autonomous driving capabilities for a given driving mode may consider or prioritize driving smoothness to avoid the occupant feeling uncomfortable. When there is no occupant on board the AV system, a lower threshold of "driving smoothness" might be acceptable during operation in the autonomous driving mode, which can increase efficiency.
5. In some unexpected situations, the AV system might have to make a sudden decision about driving mode, for example, between a choice that harms the AV system and another choice that harms another car. For example, if the AV system suddenly sees a car that it cannot avoid hitting, the AV system might have the choice of causing the AV system to swerve out of the way to avoid the car at the cost of going off the road or hitting a road barrier. Such a choice may be easier to make when the AV system is not carrying any occupant.

In some implementations, the mixed-mode controller may allow an occupant to be driven in a fully or partially autonomous driving mode to a goal position. In such situations, the mixed-mode controller may enter the autonomous driving mode when an authorized occupant is successfully authenticated, enters the AV, confirms the goal position, and explicitly requests or requires or prefers the fully or partially autonomous driving mode. In other words, in some implementations, the occupant can determine the driving mode.

In some implementations, the mixed-mode controller may transition the AV system into a partially or fully manual driving mode, if one or more occupants are determined to have successfully authenticated themselves and entered the AV system. In some cases, the AV system may be caused to enter the partially or fully manual driving mode because none of the occupants is a preferred driver or has sufficient privileges to use a partially or fully autonomous driving mode or to use certain of the autonomous driving capabilities in a given driving mode. In some cases, the AV system may prevent transitions to a partially or fully manual driving mode based on information indicating that the occupant is not capable of or not an appropriate condition to engage in such a driving mode. In some examples, one or more occupants may indicate to the AV system that he does not wish to use an autonomous driving mode. In some scenarios, the goal position may not be reached using an autonomous driving mode.

When the AV system is in a partially or fully manual driving mode, one of the occupants is expected to partially or fully manually drive the AV system. In some examples, the AV system is then configured in an imposed manual driving mode, in which none of the occupants, for example, can cause the AV system to switch to a partially or fully autonomous driving mode, except that standard safety features such as ABS, ESC, etc. may be allowed to continue to operate in their autonomous driving mode. In some implementations, when the AV system is operated in a partially manual driving mode, one or more autonomous driving capabilities may be turned on so that the AV system may, for example, perceive the driving environment and detect risky events on the roads.

When a risky event is detected, the mixed-mode controller may override one or more manual driving capabilities (e.g., applying brakes, slowing down the AV, or taking over the steering, or combinations of them).

In some implementations, when the AV system recognizes that one or more occupants have reached the goal position or exited the AV system, the mixed-mode controller may transition the AV system to the parked mode.

In some examples, transitioning the AV system into a fully or partially manual driving mode can provide advantages to the mixed-mode driving system.

1. For example, some existing transportation systems may require occupants to pick up AV systems from a predefined list of stations or locations. In such cases, an occupant is normally required to specify the station or location in the booking request, and the occupant is required to walk to an AV system's location. This arrangement may be less convenient than when an AV system having mixed-mode driving capabilities can drive to the occupant autonomously and then switch the AV system to a manual driving mode for the occupant.
2. The mixed-mode driving system may attempt to send an AV system to the occupant's preferred pickup location (e.g., the occupant's current location). The mixed-mode driving system may cause the AV system to drive in a fully autonomous driving mode from its current location to the occupant's preferred pickup location and come to a safe stop at or near the occupant's preferred pickup location. The user might then have to walk to the AV system.

When the AV system is in the parked mode, the mixed-mode controller may transition the AV system to the imposed parked mode. Once an occupant is authenticated and has entered the AV system, the mixed-mode controller may transition the AV system to the partially or fully manual driving mode and the AV system is then available for the occupant to drive manually. Similarly, the mixed-mode controller may transition the AV system from the parked mode to the partially or fully autonomous driving mode and the AV system is then available for the occupant to ride autonomously.

During a trip or at the end of the trip, the occupant may be expected to leave the AV system at a location at which the mixed-mode controller can cause the AV system to enter the fully autonomous driving mode and cause the AV system to drive itself autonomously to another location (e.g., for recharging, refueling, or picking up another occupant or object). This drop-off procedure can be implemented in various ways, including but not limited to the following:

1. In some implementations of the mixed-mode driving system, the occupant may not be required to specify a destination at the time of booking. In such cases, the occupant is provided with clear information about an autonomous service area where the occupant may be allowed to leave the AV system. This information is provided at the time of booking and also during the trip. The occupant may be assisted by providing to the occupant directions from the current location to the nearest valid drop-off location.
2. In some implementations of the mixed-mode driving system, the occupant can be required to specify her destination at the time of booking, and she can be limited to specifying destinations from which the AV system can be operated in the fully autonomous driving mode to proceed to another location. If the occupant attempts to leave the AV system at a location that is not a valid drop-off point or not the user's pre-selected destination, the AV system informs the occupant (e.g., through an in-car user interface or a smartphone app or something similar) and provides directions to the nearest valid drop-off point or the user's pre-selected destination.

Algorithmic decision. The mode transition analyzer 530 may use algorithmic analysis to determine the transition. For example, the mode transition diagram FIG. 4 may be described as a probabilistic graphical model. The probabilities of all the arrows emitting from a node are summed to one, and each probability is derived from past and currently observed data (e.g., map data, perception data, trajectory data, and any data of the factors described in this document). The mode transition analyzer 530 may use probabilistic modeling on the various factors, and infer an optimal mode (which may be the current driving mode or another driving mode) to which the AV system is transitioned. The optimal mode may be determined as the mode with the greatest probability of transitioning from the current mode.

In some implementations, the factors may be treated as hidden variables, and a hidden Markov model may be used in the algorithmic analysis regarding the current driving mode.

In some implementations, the mode transition analyzer 530 may reject the mode transition requested by a user. For example, a user may request the AV system to transition from an autonomous mode into a parked mode, but the algorithmic analysis may be unable to identify a parking space in the neighborhood and the transition may be rejected.

In some implementations, the mode transition analyzer 530 may recommend a mode transition. The recommendation may be made along with other actions (e.g., after rejecting a mode transition). For example, an autonomous mode may not be suitable in a driving environment (e.g., inclement weather, degraded driving performance, complex road configurations, and noisy sensor signals). The mixed-mode controller may recommend a manual driving mode if there is an occupant, or recommend a parked mode if a parking space is identified in the neighborhood.

Mixed-Mode Driving Server

Figure 6:
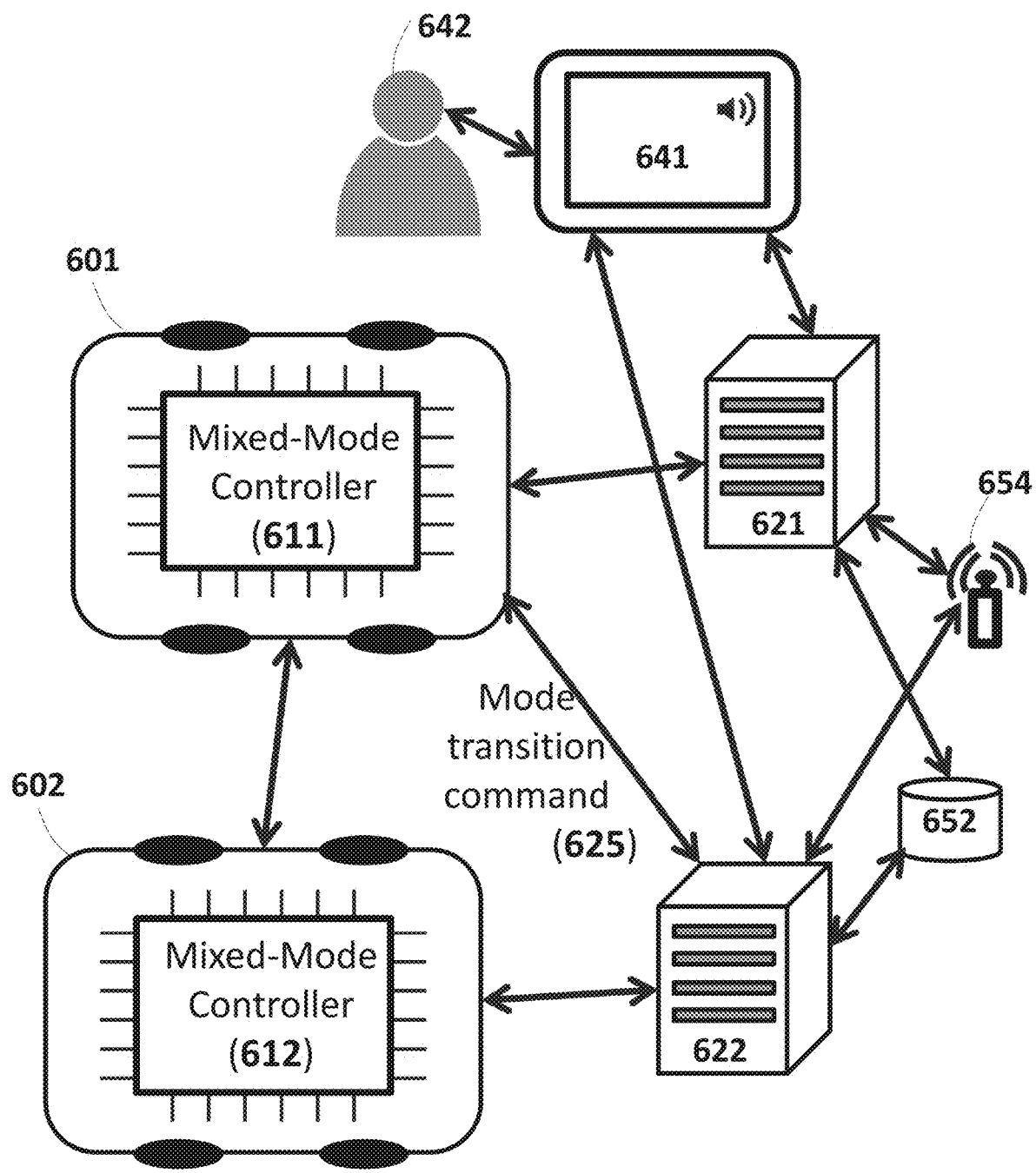
FIG. 6 is a block diagram of a mixed-mode driving system.

Referring to FIG. 6, a mixed-mode driving system may include two or more (e.g., a fleet of) AV systems (e.g., 601 and 602), each of which comprises a mixed-mode controller (e.g., 611 and 612). A fleet may comprise both AV systems and vehicles without autonomous driving capabilities. The number of the AV systems in a fleet may be at least 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, or 10,000. Such a fleet of AV systems can be managed by one or more mixed-mode driving servers (e.g., 621 and 622). The mixed-mode driving servers are in communication through wireless networks with, among other things, all of the AV systems (601 and 602) of the fleet, with data sources (e.g., database 652, and sensor 654), and with one or more computing devices (e.g., mobile device 641) where a transportation service user (e.g., 642) may request a transportation service (e.g., taxi and package shipping) via the computing device (e.g., 641).

The mixed-mode driving server (e.g., 621 and 622) may have access to various types of data; for example, profiles of users of transportation services. The profiles may include a preferred driving mode of an AV system in which the users will ride. The preferences may be expressed in advance in their profiles or expressed to the mixed-mode driving system at the time of booking a transportation service. The preferences can be expressed explicitly, or be inferred from conduct of the occupants or stored information about them, or may be obtained or inferred from other data sources (for example, social network accounts that have been linked by the users to their profiles).

A user 642 of the mixed-mode driving system may send a request to the mixed-mode driving server (621 or 622) by using a mobile device 641 or a website or by calling an operator, or by any other hailing method, or combinations of them. The mixed-mode driving server then assigns an AV system to the request from a fleet of AV systems expected to be available at that time. Different AV systems in the fleet may have different manual driving capabilities and autonomous driving capabilities and therefore may be suited to serving the requests of various respective occupants.

In some implementations, the user 642 may be comfortable riding in an AV system only when she is an occupant and is in a condition to be able to drive; thus, the mixed-mode controller may configure the driving mode of the AV system to operate in the imposed manual driving mode. She may have no objection to the AV system being driven autonomously to the goal position where she is to be picked up or autonomously from the goal position once she is no longer on board. These preferences (and a variety of other preferences about the driving mode and other characteristics of AV system) can be stored in her profile.

In some cases, the occupant may wish to have the AV system operate in an imposed manual driving mode while the AV system is in one area (e.g., urban areas, crowded areas, and neighborhoods of events) but wishes to have the AV system in an autonomous driving mode in another area (e.g., non-urban areas, non-crowded areas, and low-traffic areas). A variety of other preferences could also be expressed. The data in the profile of the user 642 can serve as one factor used by the mixed-mode controller (e.g., 611 and 612) to determine a driving mode of the AV system and to change the driving mode of the AV system from time to time.

In some uses, the mixed-mode driving server (e.g., 622) may receive a report that toxic or otherwise dangerous packages are detected or known to be on board the AV system. The server 622 can issue a mode transition command 625 to the mixed mode controller 611 to transition the AV system to the imposed manual mode 404 or disable the AV system from being driven (that is, switched to the imposed disabled mode 405). Among other things, this feature could prevent a terror attack in which a terrorist would put a bomb in the AV system and send it to a goal position in an autonomous driving mode without himself being on board.

In some instances, the mixed-mode driving server 622 may receive a report regarding an event (e.g., emergency, police action, and inclement weather). The server may analyze a suitable driving mode for the AV system 601, and issue a mode transition command 625 to the mixed-mode controller 611. For example, when the AV system 601 is in a manual driving mode and the driver is in medical emergency or intoxicated or asleep, the server 622 may determine a command 625 comprising a sequence of the following actions: (1) switch the AV system 601 from the manual driving to the imposed autonomous mode, (2) identify a nearest medical server facility as a new goal position, (3) drive autonomously to the new goal position, and (4) switch the AV system 601 from the imposed autonomous mode to the imposed parked mode when arriving the new goal position. After the mixed-mode controller 611 receives the command 625, the mixed-mode controller 611 may execute as instructed, or may coordinate with other processes (e.g., perception, trajectory planning, and motion control) to identify a best timing to execute the individual actions and transitions of the sequence.

In some cases (e.g., during emergencies), an occupant may leave the AV system at a location from which the AV system is unable to drive itself in an autonomous driving mode. Thus, the AV system must be moved by operating in a manual driving mode from the location. The removal can be achieved by the mixed-mode driving server notifying service personnel (e.g., through wireless communication) to move the AV system away, or by accepting a new booking for an occupant who can start manually driving the AV system.

In some implementations, the AV system may be requested by itself or the mixed-mode driving server to move to a new location for a variety of reasons; for example, (1) serving another booking or picking up a new occupant; (2) moving to a higher demand location where more booking requests are expected than the current location; (3) fueling or charging the AV system (particularly when the AV system is powered by electricity); (4) vehicle maintenance. In some cases, the mixed-mode controller switches the AV system to the permissive or imposed autonomous driving mode, causes the AV system to drive to its goal position, and then may cause the AV system to switch to a parked mode.

In some instances, the mixed-mode driving server 621 can, through the AV system 601 or device 641, provide positive and negative incentives (e.g., penalties) to dissuade bad behavior and encourage compliance by occupants with rules, policies, and practices specified by the mixed-mode driving server 621. In some examples, incentives may be used to discourage passengers from dropping off the AV system at locations where the AV system cannot drive itself autonomously.

The mixed-mode driving server (e.g., 621 and 622) may arrange a fleet of AV systems (e.g., 601 and 602) to enhance transportation efficiency. The following examples illustrate the enhanced efficiency.

Example 1

Traditional transportation systems, such as the ones generally used by car sharing companies, may request a user having reserved a vehicle to go to a location where the vehicle is parked, use the vehicle, bring the vehicle back to the same location, and then go back to her place. Such systems require users to: (1) make only round trips, i.e., to bring the vehicles back to the starting locations and (2) walk to and from the vehicles' parked locations. The mixed-mode driving system can avoid these limitations. The AV system may be requested by itself or by the mixed-mode driving server to drive in an autonomous driving mode to a user's start location. Thereafter the user may drive the AV system in a manual driving mode wherever she desires without having to make a round trip. And once the user exits the AV system, the AV system may be self-configured or instructed by the mixed-mode driving server to drive itself in an autonomous driving mode to a parking location or to serve another user.

Example 2

In some existing transportation systems, a user who has reserved a vehicle for a transportation service needs to walk to a location where it is parked, followed by using the vehicle and finally dropping the vehicle off at any location (within a designated area) where parking is legal. Such systems have drawbacks that the user must walk to the vehicle's parked location and that the system operator has no control over where vehicles are located at the ends of the trips. The system operator often needs to deploy its own drivers to relocate the vehicles to areas of a high demand to keep system utilization high. The mixed-mode driving system described in this document can avoid these limitations. The mixed-mode controller can configure the AV system to drive in an autonomous driving mode to the user's start location. Once the user finishes her trip, the AV system can drive in an autonomous driving mode to a parking location or to serve another user.

Example 3

In some existing transportation systems (such as taxis), a human driver has to be present in a vehicle to manually operate the vehicle. Upon a request, the driver drives the vehicle to a passenger's pickup location, takes the passenger to his destination, and then moves to the next trip or does something else. Such systems are costly because they require a human driver to provide mobility for passengers. The mixed-mode driving system described in this document may remove the limitation by (1) causing the AV system to drive in an autonomous driving mode when there is no occupant on board, and (2) allowing an occupant to drive in a manual driving mode during his trip.

User Interface

A mixed-mode driving system may comprise a user interface for a user (e.g., occupant, fleet manager, tele-operator, and package sender). The interface may be installed in the AV system (e.g., for an occupant). In some implementations, the interface may be installed along with a mixed-mode driving server. In some implementations, the interface may be implemented as a software application installed on a user's mobile device.

A user of the interface may be an occupant in the vehicle, or a user of the vehicle (e.g., for delivering a package), or a remote operator of the vehicle (e.g., a remote human operator or a computer program on a remote server).

Figure 7:
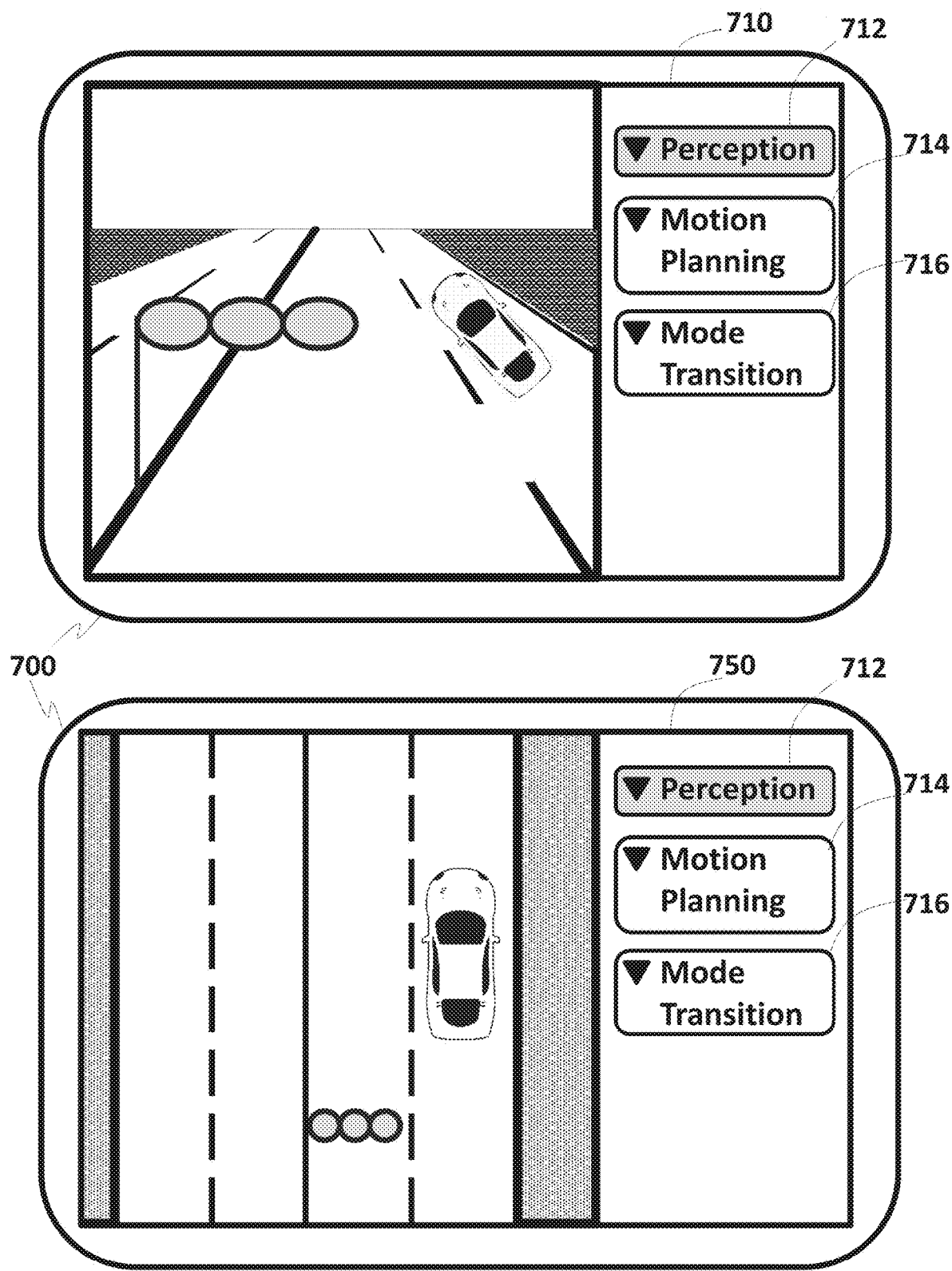
FIGS. 7 and 8 are interfaces for interacting with a mixed-mode driving system.

For example, FIG. 7 illustrates an apparatus 700 with which a user can choose what information (e.g., perception 712, motion planning 714, or mode transition 716, or combinations of them) to be displayed. In this example, the user may choose perception information 712, and the interface 710 may show a field of view of a vision sensor (e.g., camera, lidar, and radar) from the AV system. In some cases, the interface 750 may show a bird's-eye view of the vision sensor. Some implementations may comprise both a field of view and a bird's-eye view. The field of view or the bird's-eye view may be a view experienced by the AV system at the current moment, or a snap-shot at a past time or both. The perception information may comprise map information. The perception information may be an image or a video showing a 2D or a 3D view. In some implementations, the perception information may comprise processed data; for example, segmentation on images, perceived objects in vision data, detected but unrecognizable objects in vision data.

Figure 8:
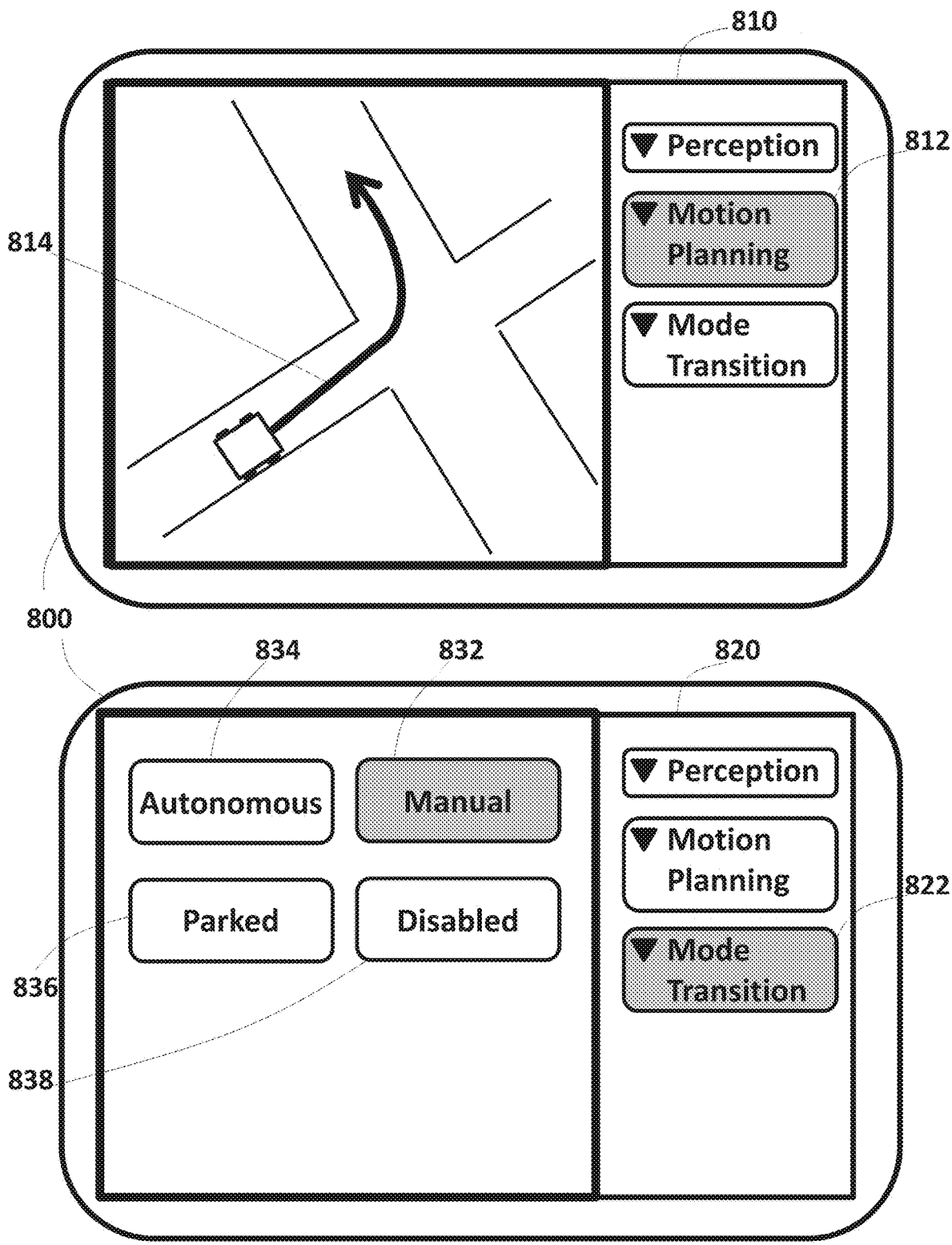

For example, FIG. 8 illustrates an apparatus 800 with which the user has chosen motion planning information 812 to be displayed on the interface 810. In some implementations, the interface 810 may show a map, a trajectory of the AV, a geolocation of the AV, or an orientation of the AV, or combinations of them. The trajectory may be a current trajectory 814 of the AV at the current moment, or a snap-shot at a past time, or a combination of them.

In some implementations, the interface may display a current driving mode, and allow the user to request another particular driving mode. For instance, the interface 820 may allow a user to click on the mode transition button 822 to select a mode for the AV system. The display may show the current driving mode (e.g., manual mode 832) and allow the user to choose another mode (e.g., autonomous 834, parked 836, or disabled 838).

In some implementations, the interface may allow a user to indicate (e.g., draw, type, gesture, say, or select) driving information of the vehicle. For example, the interface may allow the user to indicate a goal position or a trajectory. For instance, the interface may allow the user to indicate an object detected by a perception system. In some cases, the interface may allow the user to indicate a current geolocation (e.g., landmark, street number, road, latitude, and longitude) of the AV system.

In some implementations, the interface may allow a user to indicate (e.g., draw, type, gesture, say, or select) driver or occupant condition. For example, the interface may allow the user to indicate a health condition (e.g., healthy, injury, uncomfortable, motion sickness, or medical emergency). For example, the interface may allow the user to indicate a preference. Some examples of the interface may allow the user to indicate driver license information. In some cases, the interface may allow the user to indicate companion or package information.

Other aspects and implementations are also within the scope of the claims.

The invention claimed is:
1. A method comprising:
identifying, using one or more processors, a first driving mode of a vehicle, wherein the vehicle comprises an autonomous driving capability and one or more sensors that detect conditions of the vehicle;
identifying, using the one or more processors, an occupant of the vehicle;
receiving, using the one or more processors and from the one or more sensors, sensor data associated with an object on board the vehicle;
analyzing, using the one or more processors, the sensor data to infer characteristics or other status of the object;
receiving, using the one or more processors, one or more records of the occupant associated with the object from a database including a plurality of occupant records;
analyzing, using the one or more processors, the one or more records;
inferring, using the one or more processors, a purpose of having the object on the vehicle based on analysis of the one or more records and the inferred characteristics or other status of the object;
determining, using the one or more processors and based on the inferred purpose of having the object, to transition to a next driving mode following the first driving mode; and
in response to the determination to transition to the next driving mode, updating, using the one or more processors, an operation of the vehicle from the first driving mode to the next driving mode.

2. The method of claim 1, wherein determining to transition to the next driving mode following the first driving mode comprises determining the object on board the vehicle indicates danger.

3. The method of claim 2, wherein the next driving mode is a non-driving mode.

4. The method of claim 1, wherein determining, based on the inferred purpose of having the object, to transition to the next driving mode comprises determining to transition to a non-driving mode.

5. The method of claim 1, wherein: the first driving mode is a manual driving mode; at least one of the sensor data or records associated with the object indicates danger; and determining to transition to the next driving mode comprises determining to transition to an autonomous driving mode.

6. The method of claim 1, further comprising: receiving, from the one or more sensors, updated information indicating that no object or occupant is on board the vehicle; determining, based on the received information, to transition to a particular driving mode; and in response to the determination to transition to the particular driving mode, updating the operation of the vehicle from the next driving mode to the particular driving mode.

7. The method of claim 6, wherein the particular driving mode comprises one of a permissive autonomous driving mode, an imposed autonomous driving mode, or an imposed parked mode.

8. The method of claim 1, wherein determining to transition to the next driving mode is in accordance with instructions from a remote operator to cause the vehicle to transition.

9. The method of claim 1, wherein the first driving mode comprises an autonomous driving mode and the next driving mode comprises a manual driving mode.

10. The method of claim 1, wherein the first driving mode comprises a manual driving mode and the next driving mode comprises an autonomous driving mode.

11. The method of claim 1, wherein the first driving mode comprises a manual driving mode and the next driving mode comprises a disabled driving mode.

12. An apparatus comprising:
one or more processors; and
a memory storage in data communication with the one or more processors, the memory storage storing instructions executable by the one or more processors and that upon such execution cause the one or more processors to perform operations of:
identifying a first driving mode of a vehicle, wherein the vehicle comprises an autonomous driving capability and one or more sensors that detect conditions of the vehicle;
identifying an occupant of the vehicle;
receiving, from the one or more sensors, sensor data associated with an object on board the vehicle;
analyzing the sensor data to infer characteristics or other status of the object;
receiving one or more records of the occupant associated with the object from a database including a plurality of occupant records;
analyzing the one or more records;
inferring a purpose of having the object on the vehicle based on analysis of the one or more records and the inferred characteristics or other status of the object;
determining, based on the inferred purpose of having the object, to transition to a next driving mode following the first driving mode; and
in response to the determination to transition to the next driving mode, updating an operation of the vehicle from the first driving mode to the next driving mode.

13. A non-transitory computer storage medium encoded with a computer program, the computer program comprising instructions that when executed by data processing apparatus cause the data processing apparatus to perform operations of:
identifying a first driving mode of a vehicle, wherein the vehicle comprises an autonomous driving capability and one or more sensors that detect conditions of the vehicle;
identifying an occupant of the vehicle;
receiving, from the one or more sensors, sensor data associated with an object on board the vehicle;
analyzing the sensor data to infer characteristics or other status of the object;
receiving one or more records of the occupant associated with the object from a database including a plurality of occupant records;
analyzing the one or more records;
inferring a purpose of having the object on the vehicle based on analysis of the one or more records and the inferred characteristics or other status of the object;
determining, based on the inferred purpose of having the object, to transition to a next driving mode following the first driving mode; and
in response to the determination to transition to the next driving mode, updating an operation of the vehicle from the first driving mode to the next driving mode.

14. The method of claim 1, wherein the object is a hazardous object.

15. The method of claim 14, wherein the object is a weapon.

* * * * *